(12) United States Patent
Kowalski et al.

(10) Patent No.: US 8,966,025 B2
(45) Date of Patent: Feb. 24, 2015

(54) INSTANCE CONFIGURATION ON REMOTE PLATFORMS

(71) Applicant: Amazon Technologies, Inc., Reno, NV (US)

(72) Inventors: Marcin Piotr Kowalski, Capetown (ZA); Roland Paterson-Jones, Capetown (ZA); James Alfred Gordon Greenfield, Capetown (ZA)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 13/747,190

(22) Filed: Jan. 22, 2013

(65) Prior Publication Data

US 2014/0207919 A1    Jul. 24, 2014

(51) Int. Cl.
*G06F 15/16* (2006.01)
*H04L 12/911* (2013.01)

(52) U.S. Cl.
CPC ...................................... *H04L 47/78* (2013.01)
USPC ............ 709/220; 709/204; 709/207; 710/316

(58) Field of Classification Search
CPC ....................................................... H04L 47/78
USPC .......................................... 709/204, 207, 220
See application file for complete search history.

(56) References Cited

U.S. PATENT DOCUMENTS

| | | | |
|---|---|---|---|
| 8,122,282 B2 | 2/2012 | Betzler et al. | |
| 8,224,945 B2 * | 7/2012 | Lee et al. ...................... | 709/223 |
| 8,250,215 B2 | 8/2012 | Stienhans et al. | |
| 8,261,295 B1 | 9/2012 | Risbood et al. | |
| 8,271,536 B2 | 9/2012 | Amradkar et al. | |
| 8,271,653 B2 | 9/2012 | Dehaan | |
| 8,521,818 B2 * | 8/2013 | McGann et al. ............... | 709/204 |
| 8,701,143 B2 * | 4/2014 | Xu et al. .......................... | 725/62 |
| 2008/0039075 A1 * | 2/2008 | Xu et al. ....................... | 455/428 |
| 2009/0172158 A1 * | 7/2009 | Lee et al. ....................... | 709/224 |
| 2009/0319289 A1 * | 12/2009 | Pande ............................... | 705/1 |
| 2010/0064033 A1 | 3/2010 | Travostino et al. | |
| 2011/0055399 A1 | 3/2011 | Tung et al. | |
| 2011/0231525 A1 | 9/2011 | Balani et al. | |
| 2012/0072597 A1 | 3/2012 | Teather et al. | |
| 2012/0124211 A1 | 5/2012 | Kampas et al. | |
| 2012/0226789 A1 | 9/2012 | Ganesan et al. | |
| 2012/0239739 A1 | 9/2012 | Manglik et al. | |
| 2012/0253566 A1 * | 10/2012 | Ballou et al. .................... | 701/21 |

* cited by examiner

*Primary Examiner* — Jude Jean Gilles
(74) *Attorney, Agent, or Firm* — Robert C. Kowert; Meyertons, Hood, Kivlin, Kowert & Goetzel, P.C.

(57) ABSTRACT

Methods and apparatus for instance configuration on remote platforms are disclosed. A storage medium comprises program instructions to implement a control server configured to, in response to an instance configuration request directed to a network-accessible service implemented using resource instances whose configuration is managed from within the provider network, determine whether configuration operations corresponding to the request are to be performed at a remote platform external to the provider network. In response to determining that configuration operations are to be performed at a remote platform, the control server issues commands to a selected remote platform; otherwise, it issues commands to an instance host of the provider network. Based on results of the commands, the control server provides a response to the request.

28 Claims, 16 Drawing Sheets

1500

Reservations Home Page https://<website>.com/reservations

Dear John Doe, Welcome to the resource reservation center!

← 1503

Please provide your resource preferences below, and we will respond with a list of options that meet your needs.

| | | |
|---|---|---|
| Resource type (e.g., compute/storage/ bandwidth) | Compute (default) | ← 1507 |
| Preferred resource vendor | Cheapest available | ← 1509 |
| Preferred availability zone | Nearest my address | ← 1511 |
| Click to see details of available instance types and pricing policies | <Provider-network> Instance Family (may be located at third-party data centers)<br><br><Third party TP1> Instance Family<br><br><Third party TP2> Instance Family | ← 1512 |
| Number of instances needed | | ← 1513 |
| Desired reservation duration | | ← 1515 |

Submit! ← 1591

*FIG. 15*

INSTANCE CONFIGURATION ON REMOTE PLATFORMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As the functionality and features supported by providers of virtualized compute, storage and networking resources grows, and as the fleet of hardware platforms that are used by large-scale providers grows, the task of implementing administrative control operations such as configuration changes on the platforms can itself become resource intensive. The overhead of control and configuration operations may in some cases even start impacting the responsiveness of the virtualized resources as perceived by the users.

BRIEF DESCRIPTION OF DRAWINGS

FIG. 15 illustrates an example of a programmatic user interface that may be implemented to enable clients to select resource instances from a plurality of providers, including instances instantiated on third party platforms that are controlled by control server components of a provider network.

Figure 1:
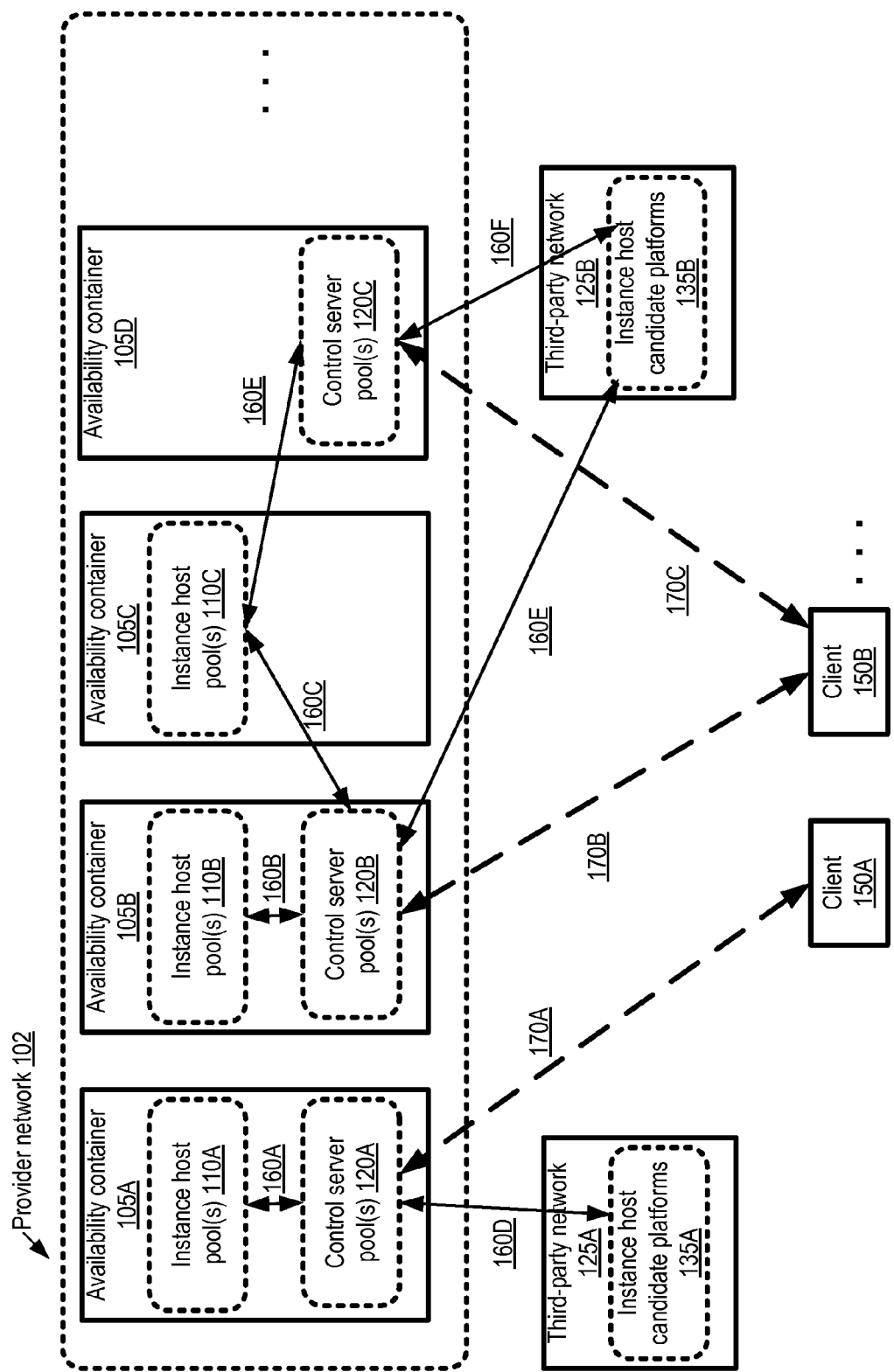
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for low overhead resource instance host configuration are described. Networks set up by an entity such as a company or a public sector organization to provide one or more multi-tenant services (such as various types of cloud-based computing or storage) accessible via the Internet and/or other networks to a distributed set of clients may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. A provider network may support single-tenant services (such as for private cloud implementations) in some embodiments, either in addition to, or instead of, multi-tenant services. Such a provider network may include numerous data centers hosting various resource pools, such as collections of physical and/or virtualized computer servers, storage devices, networking equipment and the like, needed to implement, configure and distribute the infrastructure and services offered by the provider. A subset of the resources of the provider network may in some embodiments be offered for reservation by (and allocation to) clients in units called "instances," such as virtual or physical compute instances, storage instances, or network resource instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). Resource instances of various kinds, including virtual compute instances, storage resource instances or network resource instances, may be instantiated on systems termed "instance host platforms" or "instance hosts" herein. In some embodiments, an instance host platform capable of instantiating N different virtual compute instances of a particular type may, for example, comprise a hardware server with a selected set of relatively low-level software components initially installed, such as virtualization software and/or operating system software typically utilizing a small fraction of the hardware server's compute capabilities. As more virtual compute instances are launched, a larger portion of the server's compute capabilities may get used, e.g., for client applications running on the different virtual compute instances. A number of different types of computing devices may be used singly or in combination to implement the resources of the provider network in different embodiments, including general purpose or special purpose computer servers, storage devices, network devices and the like. As described below, a subset of the provider network resources may be dedicated for control and configuration purposes (e.g., for launching, monitoring and terminating resource instances on instance hosts in response to client requests) in some embodiments. Such dedicated control resources may be termed "control plane resources", "control plane servers", or "control servers" herein. In at least some embodiments, in addition to being used to configure resource instances on instance hosts within the provider network, at least some control servers of a given provider network may also be able to remotely configure instances hosted at remote platforms external to the provider network, e.g., in third party data centers or facilities, or at point-of-presence locations or similar facilities, as described below in further detail.

According to one embodiment, control software for managing instances may be implemented in such a way as to minimize the administrative overhead imposed on the instance hosts. Much of the configuration-related processing may be offloaded from the instance hosts in such an embodiment, so that high-level decisions and metadata manipulation may be implemented at the control servers, while only simple low-level (and typically idempotent and stateless) configuration-related commands may have to be executed at the instance hosts themselves. Details about instance states and instance type definitions may not be required to be understood at the instance hosts in such embodiments. For example, in one such embodiment, a layered control software architecture may be employed at the control servers, in which an instance state manager responds to a client's instance configuration request by invoking a workflow manager component. The workflow manager may translate a higher-level configuration decision (reached by the instance state manager in response to the client's instance configuration request), in the context of an instance configuration definition provided by a configuration definer component of the control software, into one or more lower-level workflow operations specific to that configuration definition. The workflow manager may in turn transmit the workflow operations to a command communicator component of the control software at the control server. The command communicator may securely submit one or more low-level commands (such as operating system commands or virtualization software commands), corresponding to a given workflow operation, to a particular instance host over a network, in accordance with a command protocol.

At the instance host, a command receiver (such as a simple web server) may respond to a given command from the communicator by instantiating a remote command executor (RCE). An RCE, which may comprise a single thread of execution (or a software process) spawned by the command receiver on demand, may at least in some embodiments only remain active long enough to issue one or more operations, typically directed to a virtualization software component on the instance host or to an operating system component at the instance host. The RCE may exit or terminate after the operations have been initiated in such embodiments. The command receiver may provide, to the command communicator, return codes, standard output or error output generated by the RCE's operations. These results may be interpreted at the control server to determine the success or failure of the requested commands, and a response to the client's instance configuration request may be formulated accordingly in some embodiments. Thus, the instance configuration overhead at the instance hosts may be limited largely to the instantiation of the RCEs and the operations requested by the RCEs in such embodiments, thereby retaining the vast majority of the instance host resources for the use of the client-requested resource instances themselves. In some implementations, the encapsulation of configuration responsibilities at different layers of control server software may be efficient enough to allow hundreds or thousands of instance hosts to be remotely configured from a single control server or a few control servers.

In at least some embodiments, instantiating an RCE may comprise instantiating at least one thread of execution in accordance with the Common Gateway Interface (CGI), e.g., by a web server. An efficient and well-known protocol such as HTTPS (a secure version of HTTP, the HyperText Transfer Protocol) may be used for command transmissions to instance hosts, and/or to receive results from instance hosts in some implementations. The commands themselves may be formatted in an industry-standard format or notation such as some variant of JSON (JavaScript Object Notation) or XML (Extended Markup Language) in some embodiments. In other embodiments, private or proprietary protocols and/or formats may be used. The command protocol used may support a plurality of command types, of which at least a subset are designed to be idempotent—e.g., if a particular idempotent command "cmd1" with a given set of parameters is issued more than once, the second issuance and any later issuances of the command may have no negative effects.

In some embodiments the provider network may be organized into a plurality of geographical regions, and each region may include one or more availability containers, which may be termed "availability zones" herein. An availability container in turn may comprise one or more distinct locations or data centers, engineered in such a way that the resources in a given availability container are insulated from failures in other availability containers. That is, a failure in one availability container may not be expected to result in a failure in any other availability container; thus, the availability profile of a resource instance or control server is intended to be independent of the availability profile of resource instances or control servers in a different availability container. Clients may be able to protect their applications from failures at a single location by launching multiple application instances in respective availability containers. At the same time, in some implementations, inexpensive and low latency network connectivity may be provided between resource instances that reside within the same geographical region (and network transmissions between resources of the same availability container may be even faster). Some clients may wish to specify the locations at which their resources are reserved and/or instantiated, e.g., at either the region level, the availability container level, or a data center level, to maintain a desired degree of control of exactly where various components of their applications are run. Other clients may be less interested in the exact location where their resources are reserved or instantiated, as long as the resources meet the client requirements, e.g., for performance, high availability, supported software levels, and so on. Control servers located in one availability container (or data center) may be able to remotely configure resource instances at instance hosts in other availability containers (or other data centers) in some embodiments—that is, a particular availability container or data center may not need to have local control servers to manage the local resource instances.

In at least some embodiments, a control server may be configured to receive notifications when certain types of events (such as unanticipated shutdowns, or errors at various subcomponents) occur at the resource instances being managed from the control server. In one such embodiment, the control server may utilize a pre-existing event monitor that is provided with the virtualization software (e.g., the hypervisor) in use (or by an operating system in use) at the instance host platform. A lightweight event dispatcher, instantiated at the instance host on behalf of the control server, may subscribe to the event monitor in one implementation. When the event monitor informs the event dispatcher than an event has occurred, and the event dispatcher determines that a notification to the control server is appropriate for the event, the event dispatcher may transmit a corresponding notification to the control server (e.g., to the command communicator or to the workflow manager). An indication of the event may be passed up the control software stack, e.g., from the command communicator to the workflow manager and on to the instance state manager, which may update instance state metadata as needed, based on the type of event. In some embodiments, the instance state manager may initiate recovery operations if the event was an unanticipated shutdown or other failure. Recovery operations may follow a similar flow as other configuration operations in some embodiments—e.g., they may be initiated by the instance state manager, translated into successively lower-level commands via the workflow manager and the command communicator, and transmitted to the command receiver at the instance host for execution via RCEs.

One of the design goals for the layered control software architecture may be to ensure that recovery from certain types of large scale failure events can be accomplished within an acceptable timeframe. For example, even though data centers and availability zones may be implemented with various levels of redundancy at critical components to reduce data-center-wide or availability-zone-wide failures, it may be very hard to prevent such large scale failures with a 100% guarantee. Since many of the clients of the provider network may rely upon its resource instances for mission-critical functions, a reasonably quick recovery from such rare failure events may be desired. Accordingly, in at least some embodiments, the resources dedicated to control servers may be determined based on target recovery times for large scale failures. A rate at which instance recovery configuration operations may be required in the event of a large-scale failure may be estimated. A parameterized model may be generated that includes, for example, representations of the sizes of the failures to be managed (e.g., the number of simultaneous or near-simultaneous failures for which contingency plans are to be drawn up) as well as the potential mapping of those instances to different data centers, the sequences of recovery related configuration operations that would need to be performed to fully re-instantiate the instances, and the number of such operations that a recovery server with a certain level of compute and network capability may be able to orchestrate per unit time. Using various parameters of the model, including the required recovery operations rate to meet a recovery time target, the number of control servers of a particular capability level may be determined, and a pool of control servers of the appropriate type may be established. In some cases, the number of control servers needed to respond to large scale failure events may exceed the number of control servers required for normal operating conditions, in which case the provider network operator may weigh the consequences of not having enough control servers to handle the large scale failures, versus the cost of maintaining the extra control servers, before determining the number of control servers to be deployed.

In at least some embodiments, several or all of the components of the control servers, such as the workflow manager and the command communicator, may be implemented as nodes of a cluster whose size can be increased dynamically as needed. For example, there may be W workflow manager nodes and C command communicator nodes instantiated at a given point in time, and the number of nodes for each component may be increased or decreased as desired. A given hardware device may be used for one or more nodes of a given type of control server component in some implementations—e.g., it may be possible to allocate S control servers to host W workflow manager nodes and C command communicator nodes, where $S<=(W+C)$.

As noted above, a given instance host platform may be capable of supporting multiple resource instances in some embodiments. Flexible mappings between the resource instances on a given instance host and the control servers that manage them may be implemented in some such embodiments—e.g., one resource instance RI-X on a host H1 may be managed by a control server CS1, while another resource instance RI-Y on H1 may be managed by a different control server CS2. In at least some embodiments, a concurrency control mechanism may be implemented to prevent conflicting operations (e.g., two different commands to create a software storage device such as a file system with the same name or with conflicting names) from being attempted. For example, the number of concurrent configuration operations on a given instance host platform may be limited using locks in one implementation. A lock manager may be implemented in some embodiments, from which an exclusive lock (or a shared lock with restrictions on the number of sharers and/or the types of instance host operations allowed while holding the shared lock) has to be obtained prior to performing configuration operations on a given instance host.

In at least some embodiments, the modular approach used for resource instance configuration described above may also be used for other types of operations such as metrics collection or log record collection. For example, instead of pushing performance information (such as CPU utilization, memory usage or network usage measurements) from the instance host to the control server, a pull model may be implemented in which a control server metrics collector component may issue a "get-metrics" command to the instance host using the above-described command communicator. An RCE or a similar short-lived thread or process may be instantiated to collect the information using hypervisor or operating system tools at the instance host, and the results may be sent back to the metrics collector.

When a client issues an instance launch request to a control server, the specific instance host that is used for the requested instance may be selected based on any of several criteria in different embodiments. In some cases, the instance host may be selected based at least partly on identification information of the client—e.g., the client's Internet Protocol address or physical address may be used to select a data center geographically close to the client's premises. If the client requests a particular type of resource instance that is only available in some locations, or is more easily available at some data centers than others due to supply or demand variations between data centers, the instance host may be selected based on availability of the requested resource. Pricing policies (e.g., whether the client has expressed a preference for a certain price level that can best be supported using a certain set of instance hosts), as well as current performance conditions and trends within the provider network may be used to select specific instance hosts in some embodiments.

In some embodiments, the provider network's control software architecture may support the instantiation of resource instances using equipment at remote locations, e.g., at data centers or other facilities external to the provider network, or at access points between the provider network and other networks. For example, a third party provider may wish to capitalize on underused hardware at a data center by deploying the hardware for resource instances that are to be managed using control servers of the provider network. In another example, hosts at one or more Internet point-of-presence (POP) locations associated with the provider network may be utilized for remote instances using control servers in some embodiments. In some such POP locations, at least some of the hosts may be configured to support a service (such as content distribution) of the provider network, and such hosts may in some cases use a stripped-down version of the software stack typically installed on most of the instance hosts used for instantiating resource instances within the provider network. Such stripped-down hosts may be used to instantiate resource instances by control servers. The term "remote platform" may be used herein to refer to platforms that are either entirely owned/managed by third parties and are located outside the provider network, or to platforms located at POPs or similar entities that are at the boundary between the provider network and other service providers such as telecommunication providers. Similarly, the term "remote location" may be used to refer to the facilities at which such remote platforms are incorporated. A given control server may be able to manage third party platforms, as well as, or instead of, the provider network's own instance hosts in some embodiments.

The provider network operator may be willing to support such scenarios as it may increase the overall pool of resources that are accessible by clients, and also may lead to a better geographical distribution, enhanced system-wide risk management, and increases in revenue. In one such embodiment, a third party vendor (or a POP location operator) may submit a platform approval (e.g., via a programmatic interface supported by a control server component) request indicating candidate platforms located at remote facilities, that can be used for hosting virtualized resources in a manner similar to the way the provider network's own instance hosts are used. In response, a control server component responsible for verifying platform capabilities may perform one or more tests on the candidate platforms. Such tests, which may be termed "capability determination operations" herein, may include a variety of different components, including installed software stack checks, performance tests, checks to verify that the remote command executor (RCE) mechanism can be used successfully on the third party platform, and so on. If a particular candidate platform passes the tests, it may be designated as an "approved" platform on which resource instances can be configured by the provider network's control servers. (Similar capability testing may be performed on the provider network's own hardware platforms in some embodiments, prior to their use for instances.)

After a candidate remote (e.g., third party or POP) platform is approved, it may be included in a pool of available instance hosts, from which it may be selected to response to a client's instance configuration request. A similar layered control software approach may be used to configure the approved instance host platform as is used for the provider network's own instance hosts—e.g., an instance state manager, a workflow manager, and a command communicator at the control server end may cooperate to invoke a remote command executor (RCE) to perform local configuration operations on the third party platform. As in the case of communications between control servers and the provider network's internal instance hosts, secure networking protocols may be used in at least some implementations. A tunneling protocol may be used by the command communicator in some implementations, or a proxy may be used to relay communications between the control servers and the instance host platforms. In at least some embodiments tunneling or other similar techniques may be used to allow the control servers to communicate with third party platforms that are typically protected from external traffic by network security barriers such as firewalls.

In at least some embodiments, the provider network may support a set of resource instance types using its instance hosts—e.g., "small", "medium" and large" instances may be supported for virtualized compute resources, with respective definitions of the capabilities and features supported by each type. Third party platforms may also support these same types of instance sin some cases, thereby allowing a fairly seamless integration of the third party platforms into the provider network's infrastructure. In some embodiments, a third party may be allowed to define its own instance types—e.g., because the underlying hardware or software is not fully compatible with the provider network's defined instance types, or because the third party wishes to differentiate their offerings from the instance types offered by the provider network, or for some other reason. The provider network may implement client-facing interfaces (e.g., web sites or application programming interfaces (APIs)) that indicate all the different instance types that clients may obtain in such embodiments—e.g., the interface may indicate the provider network's instance types, as well as the additional instance types supported by various third party partners using the control servers of the provider network. In some embodiments, the platform approval request or some additional communication from the third party to the provider network may include an indication of the instance types that the third party wishes to support. In one embodiment, the third party provider may provide testing suggestions (or actual tests) to check the capabilities of the candidate platforms in accordance with the supported instance type definitions.

The flexible control plane architecture described above, which may be capable of accommodating platforms located at various data centers outside the provider network, may also provide opportunities for clients to deploy their own underutilized hardware platforms, or take advantage of the control plane architecture even for well-utilized client-side platforms, in some embodiments. For example, in one embodiment, just as third parties may get their platforms approved for instance hosting, a client of the provider network may get platforms that are resident within the client's network or data center approved. Once a client's platform has been approved for instance deployment, control servers within the provider network may be used to configure instances on the platform.

Example System Environment

FIG. 1 illustrates an example system environment, according to at least some embodiments. As shown, the system may include a provider network 102 comprising a number of control server pools 120 (such as pools 120A, 120B and 120C) and instance host pools 110 (such as pools 110A, 110B and 110C). A control server pool 120 may comprise a plurality of hardware and/or software control servers configured to perform configuration operations on instance hosts remotely, e.g., via commands submitted to the instance hosts of instance pools 110 in response to instance configuration requests 170 received by the control servers from clients 150 (such as client 150A or 150B). The majority of the configuration-related processing, such as processing related to the determination of which types of resource instances are to be implemented on a given instance host, instance state information, and configuration definitions/layouts to be used to instantiate instances, may be performed on the control servers, e.g., using various components described in more detail below with respect to FIG. 2. Control servers of pools 120 may transmit sequences of relatively low-level (e.g., hypervisor-level or operating system level commands) for execution at the instance hosts of pools 110, where typically short-lived remote command executors (RCEs) may be instantiated to execute a requested command or command sequence, provide the return values and then exit or terminate. In some embodiments, the commands may be formatted according to a command protocol that supports at least some idempotent operations, so that even if either the command request is somehow lost or ignored, or the return values are lost or ignored, a command may typically be re-issued without negative consequences.

Each instance host pool 110A may comprise a number of instance host platforms that can each accommodate one or more resource instances of various types, such as virtualized compute servers, virtualized storage resources and/or virtualized network resources in the depicted embodiment. The number of instance hosts included within a given pool may be determined based on various factors such as the infrastructure constraints (e.g., space, bandwidth, or power limits at the provider network's data centers), or the demand for various types of resource instances. In some embodiments where different instance types (e.g., "large" vs. "small" virtual compute instances) are supported, and/or different pricing policies are supported (such as long-term reservations versus on-demand versus "spot" pricing), some instance host pools may be dedicated to providing instances of a particular instance type, or instances priced according to a particular pricing policy. The specific instance host on which a particular client 150's instance is to be launched may be selected based on various factors such as locality (e.g. physical proximity to the client's premises or network, or to other instance hosts being used by the client), the instance type requested by the client, the pricing policy requested by the client, or the current or anticipated resource usage trends within the provider network (e.g., an instance host that has had a lower level of CPU or network utilization over a recent time period may be preferred to an instance host that has been very busy).

As shown, the instance host pools 110 and control server pools 120 of the provider network may be distributed among various availability containers 105 in the depicted embodiment—e.g., availability container 105A comprises instance host pools 110A an control server pools 120A, availability container 105B comprises instance host pools 110B and control server pools 120B, availability container 105C comprises instance host pools 110C, while availability container 105D comprises control server pools 120C. Each availability container 105 may be engineered so as to have an availability profile or failure profile independent of the profiles of other containers, so that failures (such as power outages) experienced in one availability container 105 may not be expected to be correlated with failures within other availability containers. The double-edged arrows 160, such as 160A, 160B, and 160C, indicate interactions related to configuration commands (sent from control servers at pools 120) and configuration command results (sent from instance hosts at pools 110) in the depicted embodiment. As shown by arrow 160C, control servers in a given availability container (such as 105B) may manage configuration of instance hosts in a different availability container (such as 105C), as well as within their own availability container. Some availability containers (e.g., 105A and 105B) may comprise instance host pools as well as control server pools, others (e.g., 105D) may not include instance host pools, and some (e.g., 105C) may not include control server pools in various embodiments. A given client may submit instance configuration requests to various control servers in some embodiments—e.g., client 150B may submit requests 170B to control servers of pool 120B as well as pool 120C. A given instance host pool 110 may be managed from one or more control server pools in the depicted embodiment, as in the case of instance host pool 110C, which is managed by control servers of pools 120B and 120C.

FIG. 1 also illustrates the support for configuration of third party platforms external to the provider network 102. In the depicted embodiment, control servers at pool 120A of the provider network may remotely control configuration of resource instances at approved instance host candidate platforms 135A of a third party network 125A, while control servers at pool 120B or 120C may be capable of configuring instances at approved instance host candidate platforms 135B of third party network 125B. A given control server may be capable of managing third party platforms as well as the provider network's own instance hosts, in the depicted embodiment. Third party providers such as the operators of networks 125A or 125B may submit platform approval requests to control server components within the provider network 102 in some embodiments, indicating the candidate platforms they wish to have approved for instance hosting. Capability determination tests may be initiated at the candidate platforms from the control servers, e.g., to determine whether the candidate platforms can support the RCE functionality needed for configuring instances, whether the platforms can support desired performance, availability, reliability levels, and/or whether the platforms can support desired software stacks. Once a platform is approved, it may be included in an instance host pool (e.g., in a special third party instance host pool or in one of the instance host pools already set up within the provider network), and treated in a manner similar to any other instance host of the provider network. In some embodiments, third party network operators may be able to define their own instance types, different from instance types natively supported by the provider network; in other embodiments, a third party provider may be required to support the same types of instances that the provider network supports. As noted earlier, platforms at point-of-presence locations (not shown in FIG. 1), e.g., with stripped-down versions of the provider network's typical internal instance hosts software stack, may be used to host resource instances in some embodiments, in a manner similar to the way the candidate platforms 135 are used.

As a result of implementing a modular control architecture, in which much of the configuration-related work is done by components executed at dedicated control servers rather than at instance hosts, configuration-related overhead may be minimized at the instance hosts themselves in the depicted embodiment. For example, only lightweight, stateless components may be required to support instance configuration at the instance hosts, such as a minimal web server configured to receive low-level commands via HTTPS from the control server and instantiate typically short-lived CGI processes to execute the commands, or an event listener capable of notifying the control server when certain types of rare events occur at the instance hosts. Each control server may be able to perform operations for a large number of instance hosts in some embodiments. The number of dedicated control servers that are established in a given pool 120 may be selected based on various factors in different embodiments, such as the rate at which recovery configuration operations may have to be performed in order to respond to a large-scale outage. Client instance configuration requests (and response to the requests) are indicated by arrows 170 in FIG. 1 (e.g., arrows 170A between client 150A and pool 120A, 170B between client 150B and pool 120B, or 170C between client 150B and pool 120C). Any of a variety of techniques may be used to select the particular control server or servers of a pool 120 that are to respond to a given client request—e.g., a control server may be chosen using a load balancing mechanism, or based on client affinity (e.g., requests from the same client IP address may be dealt with by the same control server), or at random. Additional details regarding the functionality of various control server components, and interactions between clients, control servers and instance host platforms, are provided below.

Control Server and Instance Host Components

Figure 2:
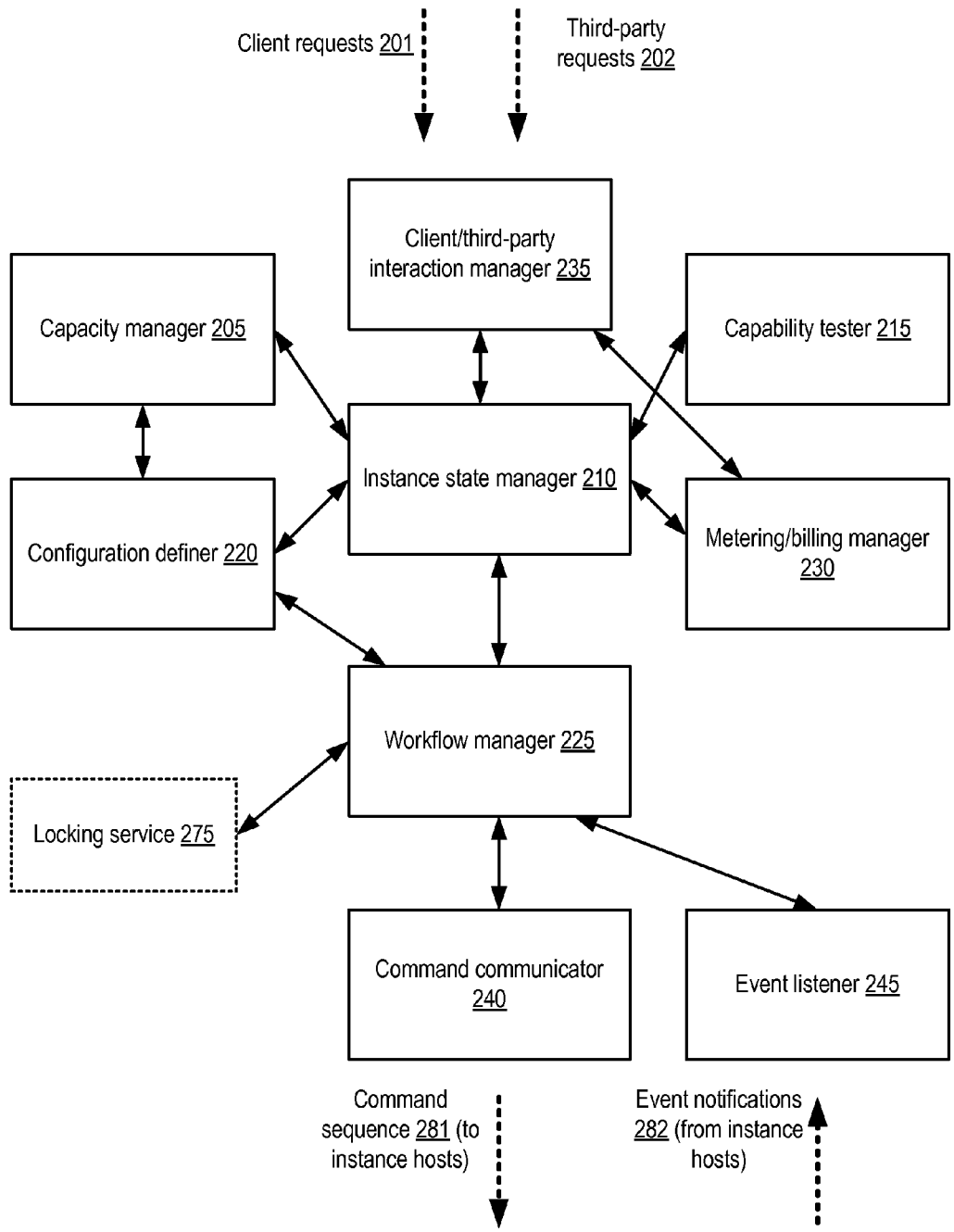
FIG. 2 illustrates example components of control servers configured for remote configuration of instance host platforms, according to at least some embodiments.

FIG. 2 illustrates example components of control servers configured for remote configuration of instance host platforms, according to at least some embodiments. The mapping between the illustrated components, and hardware/software servers on which the components are implemented, may vary over time and in different embodiments. For example, in some implementations, it may be possible to instantiate each of the illustrated components on a single computing device, while in other embodiments, one or more computing devices may be used for instances or nodes of a particular component (e.g., multiple workflow manager nodes may be instantiated, with one or more workflow manager nodes incorporated at a given computing device).

A client and third party interaction manager component 235 may be responsible for receiving incoming client requests 201 and/or third party requests 202, such as instance launch or configuration requests, or approval requests for third party or client-owned platforms in the depicted embodiment. Is some embodiments, one or more programmatic interfaces (such as web pages, web sites, APIs, graphical user interfaces or command-line tools) may be implemented to support the client interactions and/or third party interactions. Instance state manager 210 may be responsible for orchestrating configuration operations in response to client or third-party requests, for responding to outages or unexpected instance shutdowns, and/or for registering new instance hosts in the depicted embodiment. For example, in response to an instance launch request from a client, the instance state and recovery manager 210 may identify (with the help of capacity manager 205) exactly which instance host is to be used for the launch, and may then issue a launch command to the workflow manager 225, to be translated into lower-level commands for eventual execution at the selected instance host.

Capacity manager 205 may be configured in the depicted embodiment to ensure that instance host pools 110 are adequately sized for the expected demand, and/or to move resources between pools if needed. Capability tester 215 may be configured to run tests (such as performance tests, software stack confirmations, and the like) to help with the decision to approve third party candidate platforms and/or to verify that instance hosts within the provider network are adequately provisioned. Metering/billing manager 230 may be configured to determine, based for example on metrics such as network request counts, measured traffic, I/O counts, CPU utilization and the like, how much a given client is to be charged for using a particular resource instance over a billing period, in accordance with the particular pricing plan in effect for the client.

Configuration definer 220 may be responsible in the depicted embodiment for generating, for a particular instance type to be launched, details of a specific configuration layout (e.g., names of various file systems and software devices to be set up, parameter values for various tunable settings, and the like) to be implemented at a particular instance host. Workflow manager 225 may be responsible for receiving the high-level command issued by the instance state manager 210, and configuration layout details from the configuration definer 220, and translating the command into a workflow that includes one or more lower-level commands. Workflow manager 225 may then hand off the workflow commands to the command communicator 240, which may transmit the corresponding command sequence 281 (e.g., formatted in JSON or XML) to a selected instance host (e.g., via HTTPS) for execution via RCEs. In some embodiments, a locking service 275 may be used by the workflow manager 225 (or by other components illustrated in FIG. 2) to ensure that an instance host configuration does not get corrupted due to conflicting or overlapping modification requests—e.g., an exclusive lock on an instance host may be required before a configuration change of a particular type is allowed. The locking service 275 may not be a component of the control servers in some embodiments, e.g., a pre-existing locking service used for other purposes in the provider network may be used. A control server may also include an event listener 245 in some embodiments, configured to receive notifications when certain types of events (such as unexpected shutdowns, hardware or software errors or failures that may affect resource instances) occur at instance hosts. The event listener 245 may transmit the information about events to the instance state manager in some embodiments, which may interpret them appropriately to determine, for example, whether instance state information needs to be updated. In at least some embodiments, command communicator 240 may also submit low level commands to the instance hosts to collect performance or other metrics from the instance hosts, e.g., on behalf of metering manager 230; in such embodiments, the set of commands issued by the command communicator may include non-modifying commands for metrics collection, as well as modifying commands to implement configuration changes.

It is noted that while instance state manager 210, as indicated by its name, may be aware of the state of various resource instances, lower-level components such as workflow manager 225, command communicator 240, and/or event listener 245 may be stateless, at least in the sense that knowledge of, or details about, instance state may not be needed by such lower-level components to perform their functions in the depicted embodiment. By restricting information about instance states to a limited set of components, the implementation of stateless components such as the workflow manager and the command communicator may be substantially simplified in such embodiments. It is also noted that while the double arrows of FIG. 2 indicate examples of some of the types of interactions that may occur between the various control server components illustrated, additional types of interactions may also be supported between the components in at least some embodiments—e.g., any one of the components may be able to communicate with any other component in some embodiments.

Figure 3:
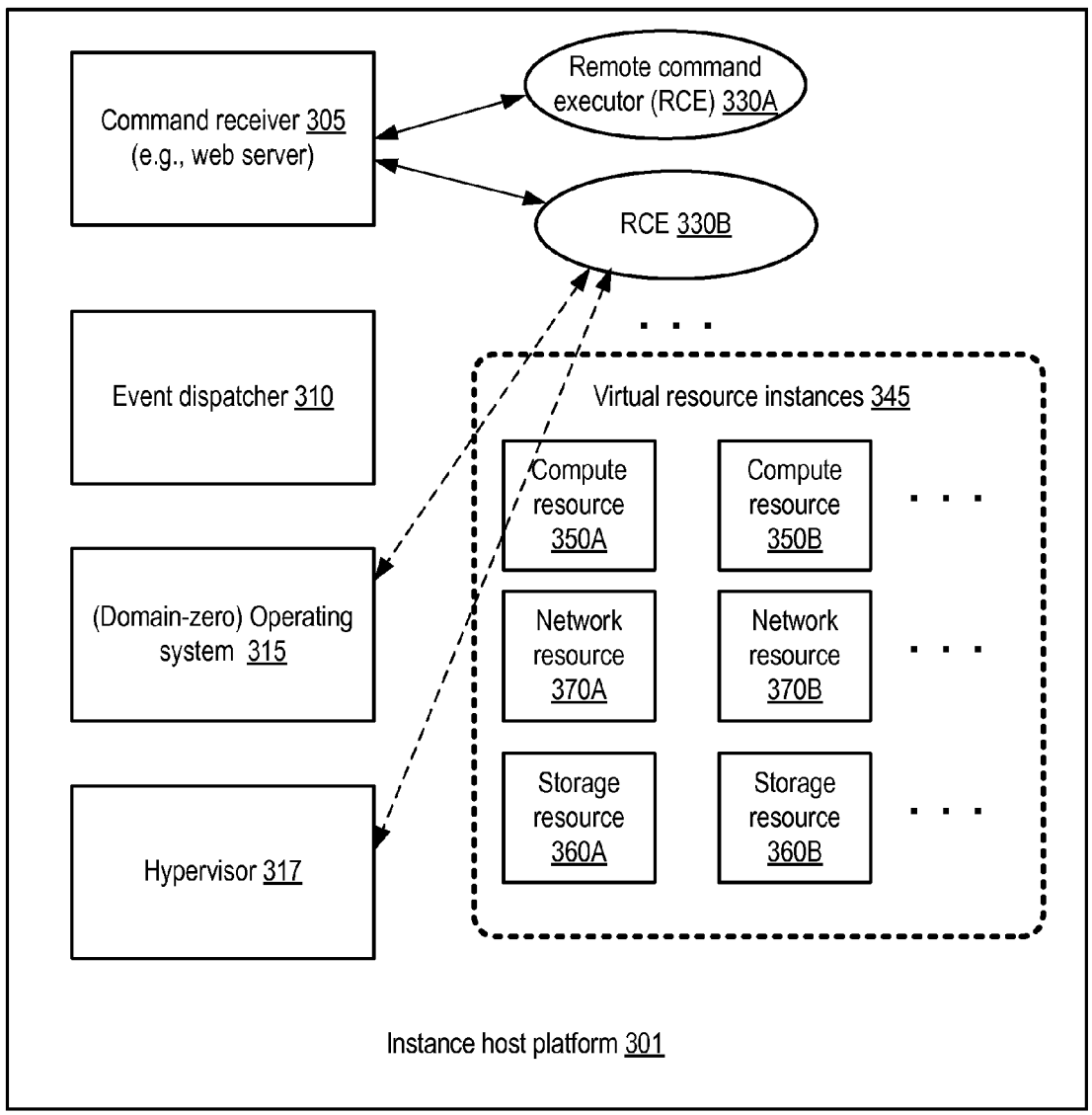
FIG. 3 illustrates example components of instance host platforms, according to at least some embodiments.

FIG. 3 illustrates example components of instance host platforms (which may include platforms owned by the provider network operator, as well as third party platforms), according to at least some embodiments. As shown, the instance host platform may include a command receiver component 305, such as a web server, configured to receive the sequence of commands generated by the command communicator 240 of the control server. The instance host may also include a hypervisor 317 providing the virtualization functionality on top of the bare hardware of the host. The hypervisor 317 may organize the resources of the instance host platform into a plurality of domains in the depicted embodiment, with one domain (which may be called domain zero) being used for administration, and the other domains being used for resource instances. An instance of an operating system 315 may be set up in domain zero. In response to each received command, or to a sequence of commands, the command receiver 305 may instantiate a remote command executor (RCE) 330, such as 330A or 330B. The RCE 330 may then issue a request for an operation, e.g., an operation directed to the hypervisor 317 or to the domain-zero operating system 315. In some embodiments RCE 330s may be considered, or implemented as, components of the domain-zero operating system 315 or the hypervisor 317. After issuing its operation request(s), and receiving the results (including for example return codes, error output or standard output), a given RCE may terminate or exit in the illustrated embodiment. The RCE may exit or terminate of its own accord in some implementations, while in other implementations an RCE may be terminated by the command receiver 305 (e.g., using a "kill" signal or some other mechanism). In other embodiments, RCEs may remain in existence for longer time periods than needed just to initiate a given operation—e.g., a pool of RCEs may be maintained. In at least one implementation, each RCE may represent a CGI process or thread of execution. In some embodiments, an RCE may start a long-running operation and exit, and the results of the long-running operation (which may continue after the RCE exits) may be obtained asynchronously by the command receiver.

The operations initiated by the RCEs may (if the operations succeed) eventually result in the implementation of the configuration commands from the workflow manager 225, resulting for example in the instantiation of (or configuration modifications of) various virtualized resource instances 345, such as compute resources 350A or 350B, storage resources 360A or 360B, or network resources 370A or 370B. The RCEs and the command receiver may also be stateless with respect to instance state, in the sense that they may be unaware of what state a particular instance is in at a given time, in the depicted embodiment. In some embodiments where the instance host is organized into domains by the hypervisor, each virtual resource instance may correspond to a respective domain. The instance host may also comprise an event dispatcher 310 in the depicted embodiment. The event dispatcher may subscribe to one or more event monitors (e.g., monitors implemented within the hypervisor 317 or the domain-zero operating system 315). The event monitor(s) may notify the event dispatcher if and when certain types of events occur at the instance host, and the event dispatcher may notify the event listener 245 at a control server about the events, either directly or via the command receiver in various embodiments.

Example Request/Response Flows

Figure 4:
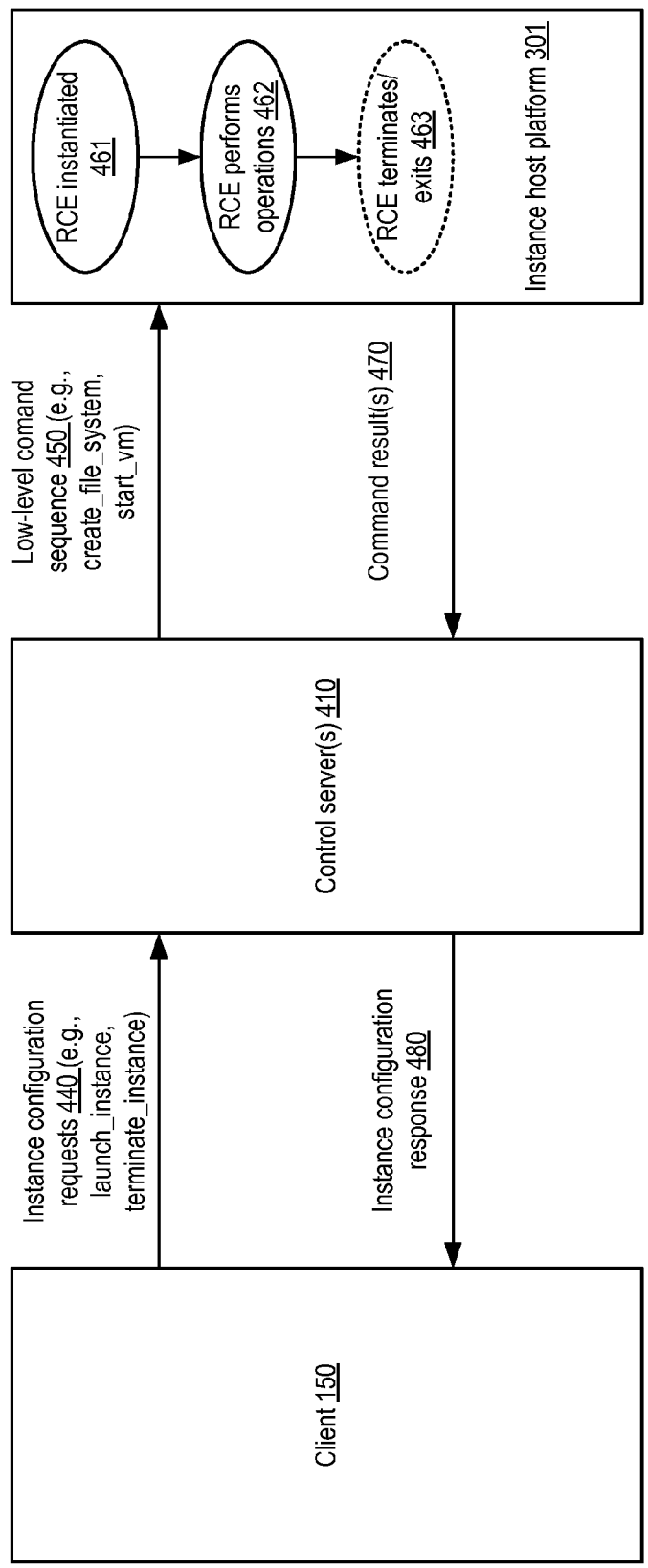
FIG. 4 illustrates example interactions between clients, control servers, and instance host platforms, according to at least some embodiments.

FIG. 4 illustrates example interactions between clients, control servers, and instance host platforms, according to at least some embodiments. As shown, a client 150 may submit an instance configuration request 440, such as a request to launch or terminate an instance, to a control server 410 in the depicted embodiment. The client request may be transmitted via a programmatic interface such as a web page or an API implemented by an interaction manager component 235 of a control server 410 in some embodiments. A number of components of the control server layer (such as the instance state manager 210, the workflow manager 225 and/or the command communicator 240) may cooperate to translate the instance configuration request into a sequence of low-level commands 450 that are transmitted to the instance host platform 301.

The low-level command may be translated into RCE operations in the depicted embodiment at the instance host platform 301. As shown, an RCE may be instantiated (element 461 of FIG. 4), e.g., by spawning a new process or thread, the RCE may issue or perform one or more operations (element 462), and then exit or terminate (element 463). The results 470 of the commands may be sent back to the control server 410. Based on the results 470, an instance configuration response 480 may be sent back to the requesting client 150. Command sequence 450 and/or results 470 may be transmitted using any appropriate secure networking protocol, such as HTTPS, in various embodiments. The commands and results may be formatted in accordance with a variant of JSON or XML in some embodiments. The command protocol used may support at least some idempotent operations in various embodiments. In some embodiments, the command protocol may support a variety of other command types and functions including performance metrics collections, log record collection and the like—e.g., in order to determine billing amounts for a client that owns one or more resource instances at the instance host platform 301, low-level commands may be issued by the control server 410 to determine how many operations of various kinds the client issued to the instances, or how much network traffic the client incurred at the instance host platform. In some implementations, a mechanism other than RCEs may be used for certain types of control server-requested operations such as metrics or log record collection, while in other implementations RCEs may be used for both configuration modification and metrics/log collection.

Figure 5:
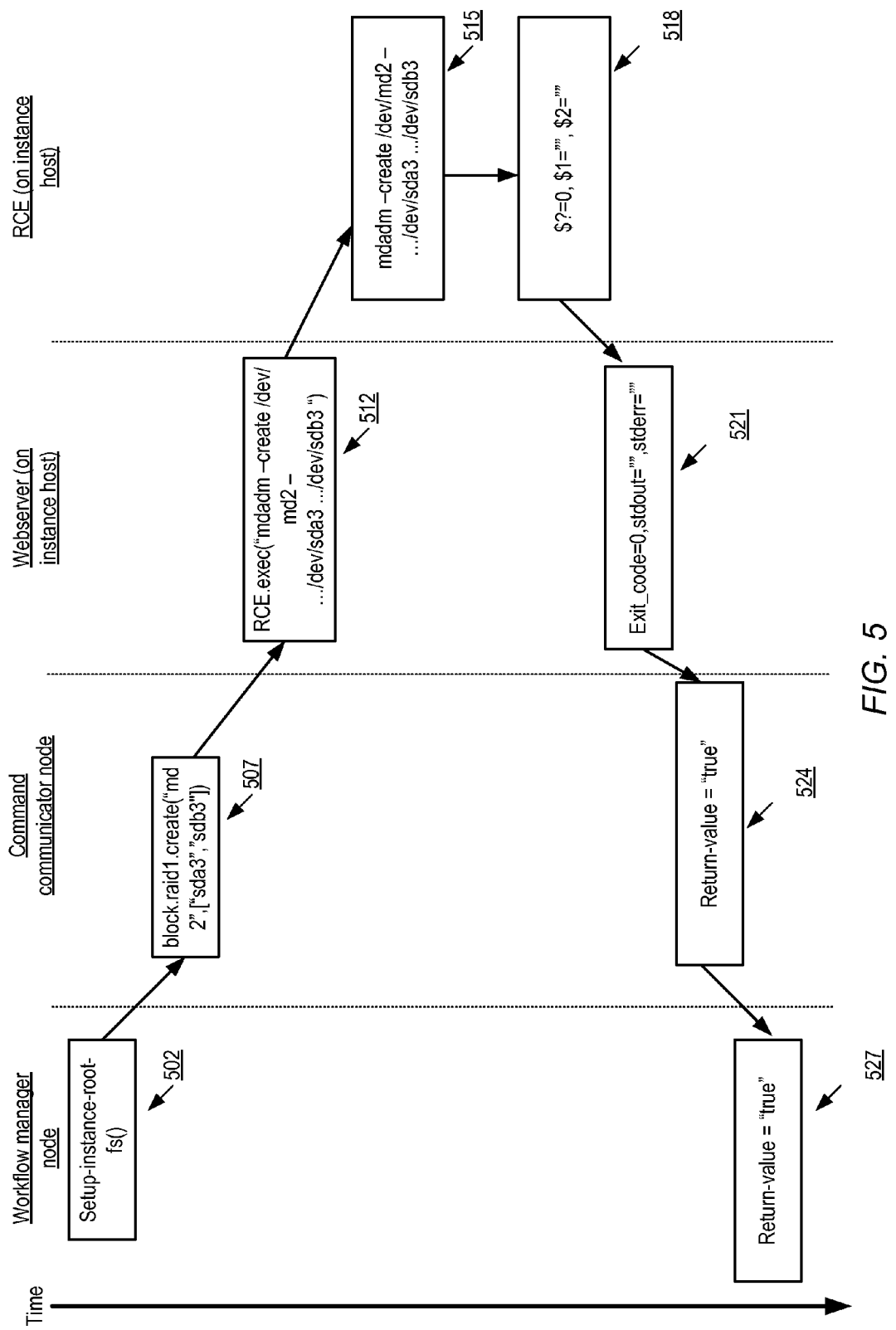
FIG. 5 illustrates an example of command flow starting from a workflow manager node at a control server, according to at least some embodiments.

FIG. 5 illustrates an example of command flow starting from a workflow manager node at a control server, according to at least some embodiments. The illustrated example deals with the creation of a software RAID (redundant array of independent disks) device at an instance host, which may represent part of the configuration required to set up a new virtual compute instance. The example is provided here to illustrate, using a concrete example, the level of command detail at which different components of the control server and the instance host may operate in one embodiment; many other types of configuration operations, unrelated to RAID devices, may be implemented using commands of similar granularity in various embodiments. Elapsed time increases from the top to the bottom of FIG. 5.

The workflow manager 225 may receive a high-level request to set up a root file system for a compute instance (element 502 of FIG. 5) in the depicted embodiment, e.g., from instance state manager 210 in response to a client's request for a new compute instance. The workflow manager 225 may submit, to the command controller 240, a command "block.raid1.create" directed to a block device subsystem (element 507), requesting creation of a RAID1 device with specified parameter values (e.g., for software device names such as "md2", "sda3" and the like). The workflow manager 225 may have determined the parameter values based at least in part on a configuration definition or layout obtained from the configuration definer 220 for the new instance to be created.

In response to the "block.raid1.create" command, the command communicator 240 may submit an "RCE.exec" command to the instance host's command receiver 305 (element 512). The command receiver 305 may in turn instantiate an RCE process or thread that executes the requested operation, in this case an invocation of an "mdadm" (multiple device administration) command at the domain-zero operating system layer (element 515). The RCE process or thread may obtain the return value or exit code from the invocation (the "$?" value in element 518), the standard output from the invoked operation (the "$1" value in element 518), and the standard error from the invoked operation (the "$2" value in element 518). These results may be transmitted by the command receiver back to the command communicator 240 (element 521). The command controller 240 may in turn translate the results into a return value (e.g., "true", indicating success in this example) for "block.raid1.create" command it had received, and transmit the return value back up to the workflow manager 225 (element 524). The workflow manager 225 may similarly determine a return value for the "setup-instance-root-fs" command it had received, and provide this return value (also "true" in this example) to the instance state manager (element 527). It is noted that the various components whose interactions are illustrated in FIG. 5 may not be aware of instance state information, which may be maintained by the instance state manager; instead, each of the depicted layers may simply perform lower level operations as needed, the accumulated results of which may contribute to a change in instance state (e.g., to a launch, a reconfiguration, or a termination of an instance).

Figure 6:
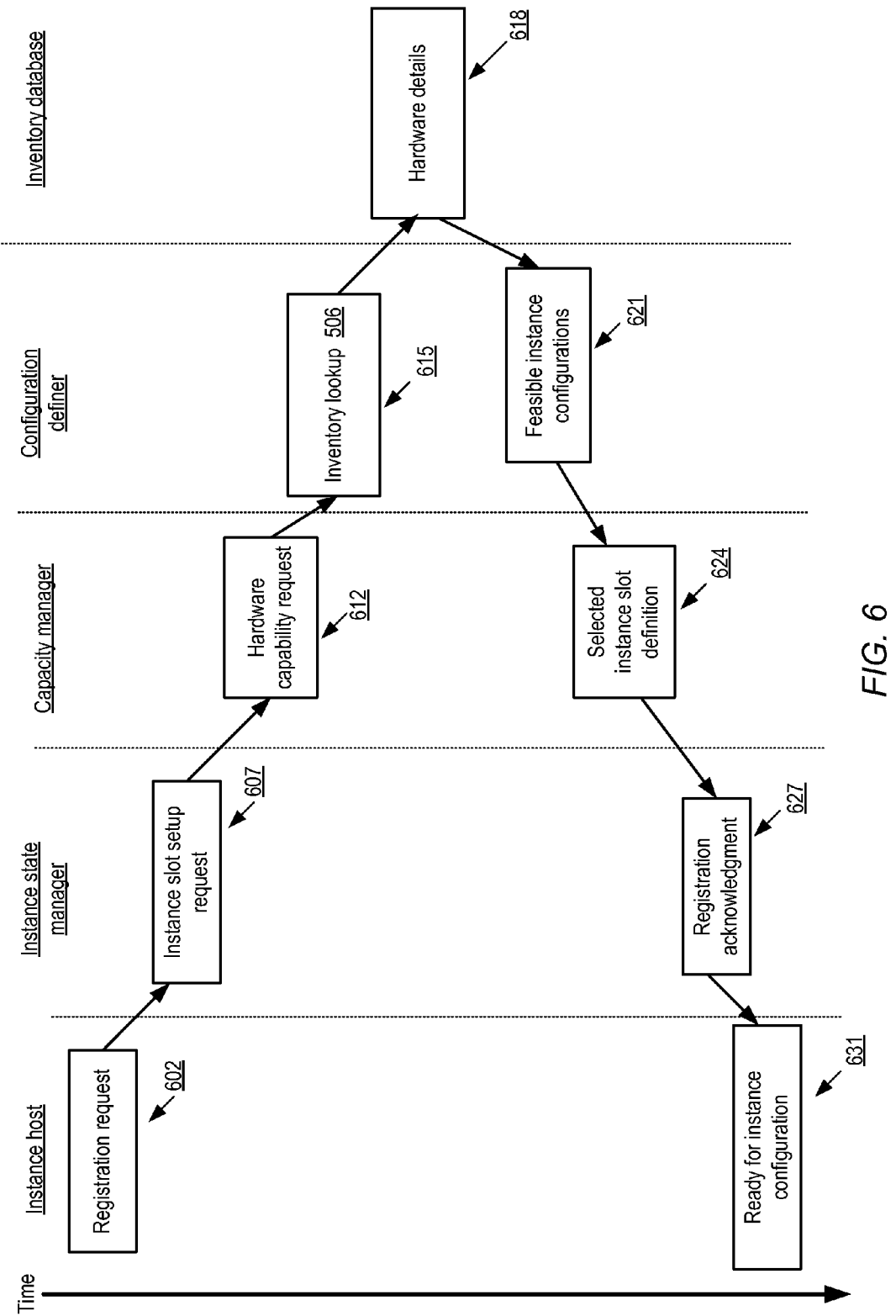
FIG. 6 illustrates example operations associated with registration of an instance host platform, according to at least some embodiments.

In some embodiments, when a new instance host platform is added to a data center of the provider network, a decision may have to made regarding the specific types and numbers of resource instances that are eventually to be deployed on the host. The new instance host may be said to "register" for hosting instances in such embodiments, and a result of the registration may include a determination of a number of "instance slots" (logical representations of potential instances that could be launched on the host) of one or more instance types. FIG. 6 illustrates example operations associated with registration of an instance host platform, according to at least some embodiments. As in the case of FIG. 5, elapsed time increases from the top to the bottom of FIG. 6. As shown in element 602, the instance host may transmit a registration request (or a registration request may be transmitted on behalf of the instance host) to an instance state manager 210. In some embodiments, a registration manager separate from the instance state manager may be used to orchestrate the registration process. The instance state manager 210 may, in response to the registration request, transmit an instance slot setup request to the capacity manager 205, as indicated by element 607. The instance slot setup request may represent the equivalent of a request to answer the question "how many instance slots, and of what instance type(s), should instance host X support?" The capacity manager 205 may respond to the instance slot setup request, at least in part, by submitting a hardware capability request to the configuration definer 220, as indicated in element 612. In at least some embodiments, information about the hardware capabilities of the computing devices that have been acquired by the provider network as instance hosts may be available in an inventory database. In some implementations, a few "standard" types of hardware devices such as rack-based servers from one or more preferred vendors may be used for instance hosts in the provider network, so there may not be a need for performance testing at the time of registration—i.e., the inventory may contain enough information to determine the capabilities of the instance host. The configuration definer may perform an inventory lookup (element 615) to retrieve the hardware details of the instance host (element 618).

Based on the hardware details, the configuration definer may formulate a set of feasible instance configurations (element 621) for the instance host—e.g., the configuration definer may determine that the instance host may be able to host M "large" compute instances, N "medium" compute instances, or "P" small compute instances, based on the definitions of "large", "medium" and "small" instance types that are in use in the provider network. The list of feasible configurations may be provided to the capacity manager 205. The capacity manager may then select one of the feasible configurations for the instance host, based on various factors such as the current and anticipated supply and demand for various types of instances. In some embodiments the capacity manager 205 may also take into account pricing policies and/or current resource utilization levels at the data center or availability container in which the new instance host is situated. The capacity manager 205 may then transmit a selected instance slot definition (e.g., "N large instance slots") to the instance state manager (element 624), which may store the slot definition in a metadata database. The instance state manager 210 may provide a registration acknowledgement (element 627) to the instance host in some embodiments, which may indicate to the instance host that it is ready for instance configuration (element 631). In other embodiments, the process of determining the number and type of instances for which a particular instance host is to be utilized may differ from that shown in FIG. 6.

Figure 7:
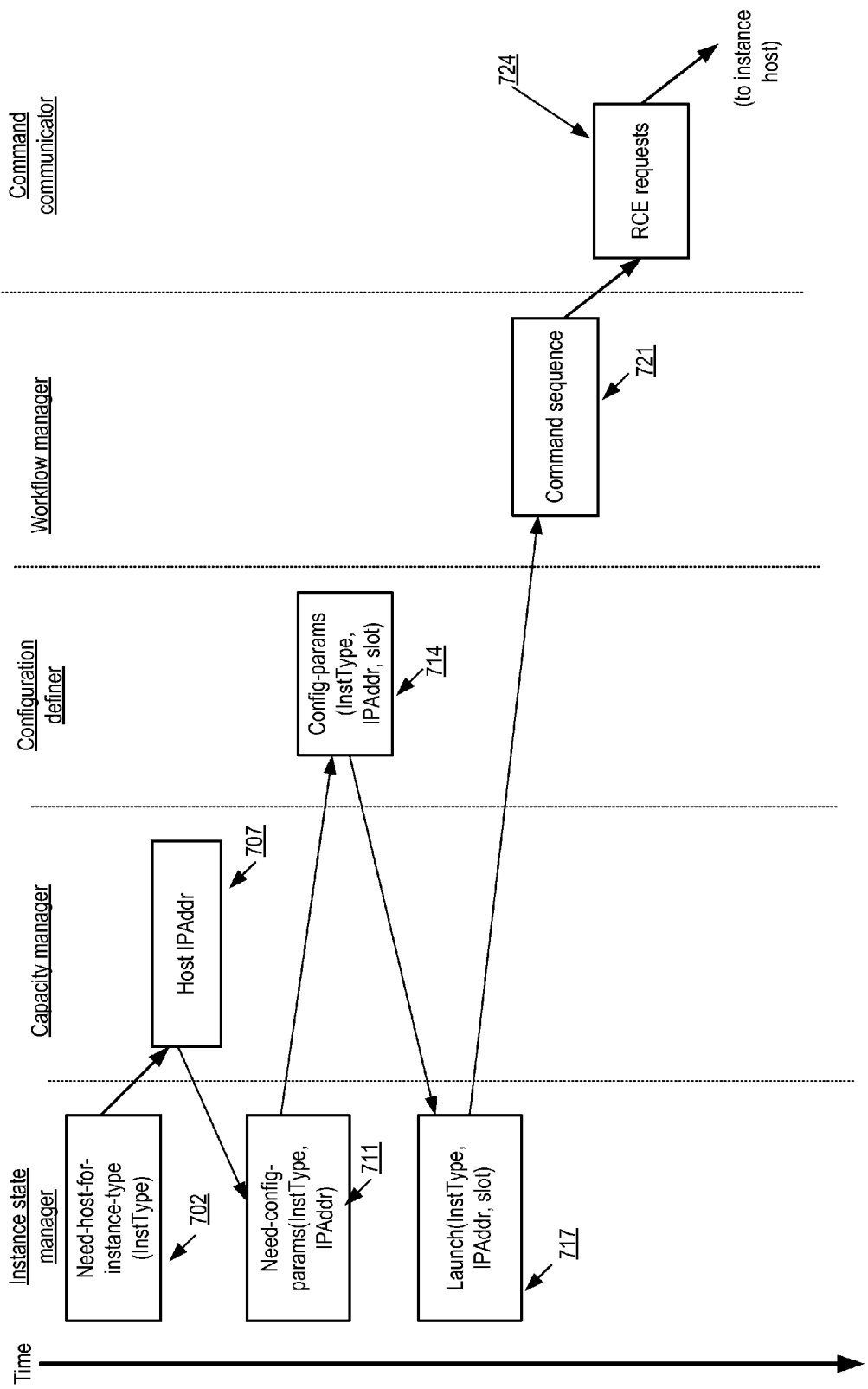
FIG. 7 illustrates example operations associated with launching a resource instance, according to at least some embodiments.

FIG. 7 illustrates example operations associated with launching a resource instance, according to at least some embodiments. Elapsed time increases from the top to the bottom of FIG. 7. An instance state manager 210 may receive a request from a client 150 to launch a resource instance of a specified instance type (such as a "small", "medium" or "large" compute instance) in the depicted embodiment. The instance state manager 210 may send a request to the capacity manager 205 (as shown in element 702 of FIG. 7), indicating the instance type required. The capacity manager 205 may determine, based at least in part on a database of instance host pools 110, a specific instance host 301 and a specific IP address to be used for the instance to be launched, and provide at least the IP address to the instance state manager (element 707). The instance state manager 210 may then submit a request for specific configuration parameters and layout information to the configuration definer (element 711), indicating the instance type and the IP address. In the illustrated embodiment, the configuration definer may provide the requested configuration parameters, including a specific slot number at the instance host, back to the instance state manager (element 714). The instance state manager may then issue a launch command to the workflow manager 225 (element 721), indicating the instance type, the IP address and the slot number. The workflow manager 225 may the initiate a sequence of commands (element 721) to the command communicator 240, which in turn may submit a sequence of commands to the instance host for execution using one or more RCEs (element 724).

HTTPS Command Requests and Responses

Figure 8:
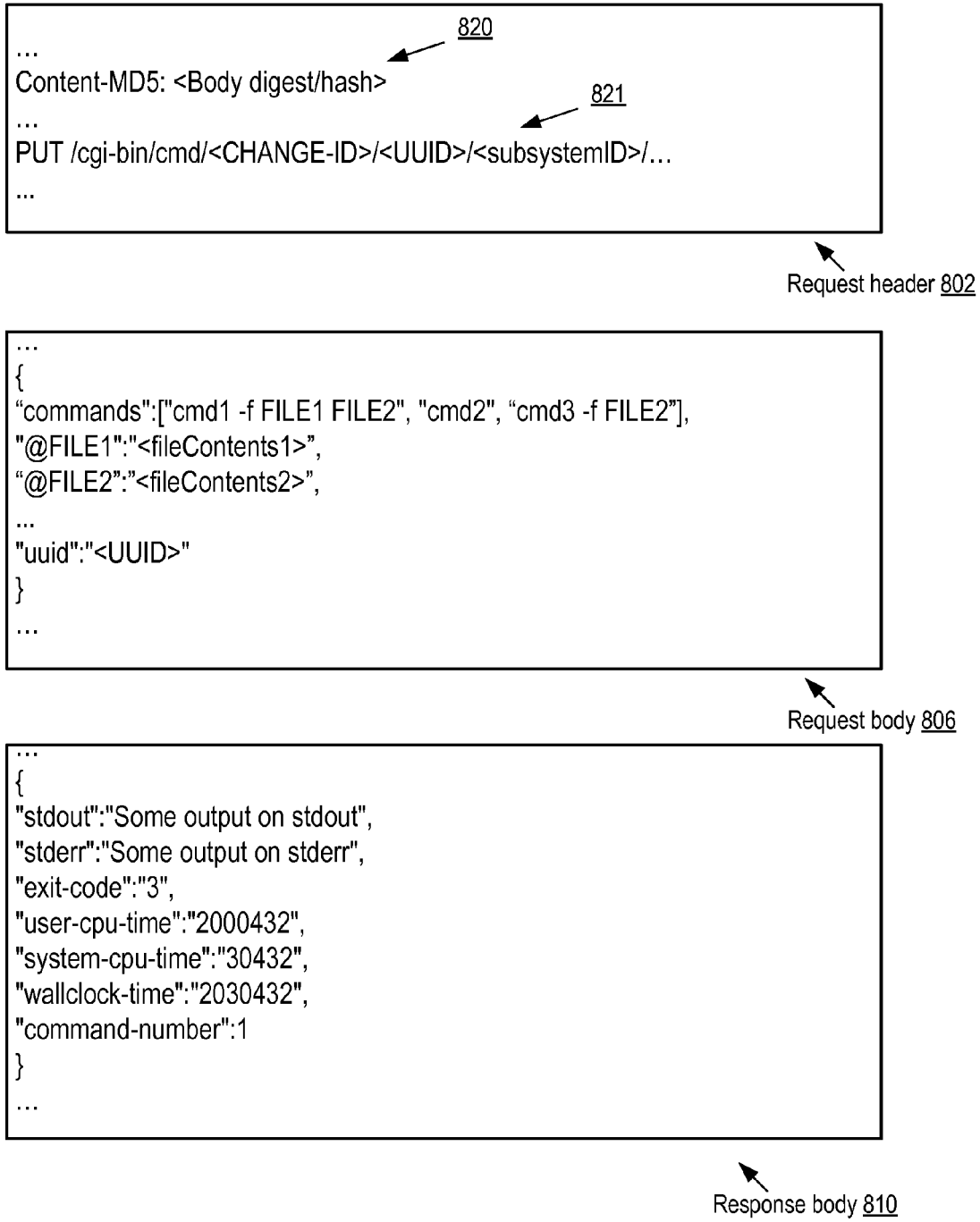
FIG. 8 illustrates example elements of command requests issued to an instance host from a control server, according to at least some embodiments.

In at least some embodiments, as noted earlier, communications between the control servers and the instance hosts may be implemented using a secure protocol such as HTTPS. FIG. 8 illustrates example elements of command requests issued to an instance host from a control server, according to at least some embodiments. The HTTPS requests and responses formats used may comprise a plurality of headers and body elements, of which only a few examples are provided in FIG. 8. As shown in element 802, a request header used for a command sent to the instance host's command receiver from a control server's command communicator may include a digest or hash value 820 determined from the body of the request, so that the integrity of the request body can be verified at the instance host. The request header may specify the HTTP "PUT" verb or request method, as shown in element 821, with a resource name that includes a "CHANGE-ID", a "UUID", and a "subsystemID". The CHANGE-ID may represent the specific client request that led to the command being issued; the CHANGE-ID corresponding to a given client request may be assigned for example by the client interaction manager 235 in some embodiments, and may be passed as a parameter in the command and response flows between the different components of the control server such as those shown in FIG. 4, FIG. 5, or FIG. 7. A universally unique identifier or UUID may be generated for the specific command request in the depicted embodiment, e.g., the command communicator 240 may generate a distinct UUID for each command request it sends to the instance host. The subsystem identifier may indicate the specific subsystem at the domain-zero operating system or hypervisor layer that is to be used to perform the requested operation in the depicted embodiment. In at least some embodiments, log records may be generated when a command request is sent, received, or when the corresponding operation is executed at the instance host, and the log records may include some or all of the CHANGE-ID, the UUID, and the subsystem ID, allowing for easier debugging or correlation analysis.

The body 806 of the HTTPS request may include a sequence of commands in accordance with a defined command protocol, specified using a JSON-like syntax in the depicted example of FIG. 8. In some embodiments, the command protocol may allow the specification of file contents within the request body 806, where the file contents may serve as parameters of some or all of the commands. For example, in FIG. 8, the contents (e.g., in URL-encoded hexadecimal form) of two files with labels @FILE1 and @FILE2 may be included in the request body. As show, the keyword "commands" may indicate the sequence of commands included in the request. Three commands—"cmd1", "cmd2" and "cmd3" are shown in the sequence. "cmd1" has two file parameters FILE1 and FILE2, whose respective contents are indicated by @FILE1 and @FILE2. "cmd2" does not have any file parameters, while "cmd3" has a single file parameter FILE2. According to the command protocol in use, when an operation corresponding to "cmd1" is executed at the instance host via an RCE, the contents of @FILE1 and @FILE2 would be provided as parameters for the operation in the depicted embodiment. Similarly, when an RCE performs an operation corresponding to "cmd3", the contents of @FILE2 would be provided as a parameter. The specification of files in the request body in the manner shown in FIG. 8 may represent a convenience function in the depicted embodiment; other approaches, such as separate messages containing the file contents, may be used in other embodiments. In some embodiments, the command protocol may require that the commands be executed at the instance host in the order in which they appear in the request body; in other embodiments, such an ordering may be not be required. In one implementation, a maximum limit may be imposed on the number of commands that can be transmitted in a single request. In other implementations, no limit on the number of commands may be imposed. The UUID of the request header may be included in the body, as shown in FIG. 8, in some embodiments. Different formats than the JSON-like format shown in FIG. 8, such as XML, may be used to indicate the command sequence in other embodiments.

In some embodiments, the reply to the command request may include separate clauses or elements for each of the commands of the sequence. The response clause for the first command in the command sequence of request body 806 ("cmd1—F FILE1 FILE2") is shown in response body 810 for one embodiment. The "command-number" value ("1" in the depicted example) indicates that the clause is for the first command of the sequence. The standard output produced by the execution of the first command is indicated in the "stdout" field. The standard error output is indicated in the "stderr" field. The exit-code of the command (e.g., a value returned by the operating system or hypervisor component used) is indicated in the "exit-code" field. In addition, the response clause contains metrics for the wall-clock time (the elapsed time taken to complete the command on the instance host), as well as system and user CPU times indicating resource usage taken for the command at the instance host, expressed in units such as microseconds or milliseconds. Other formats than those shown in FIG. 8 may be used for commands and/or for command responses in various embodiments.

Methods for Remote Configuration of Instance Hosts

Figure 9:
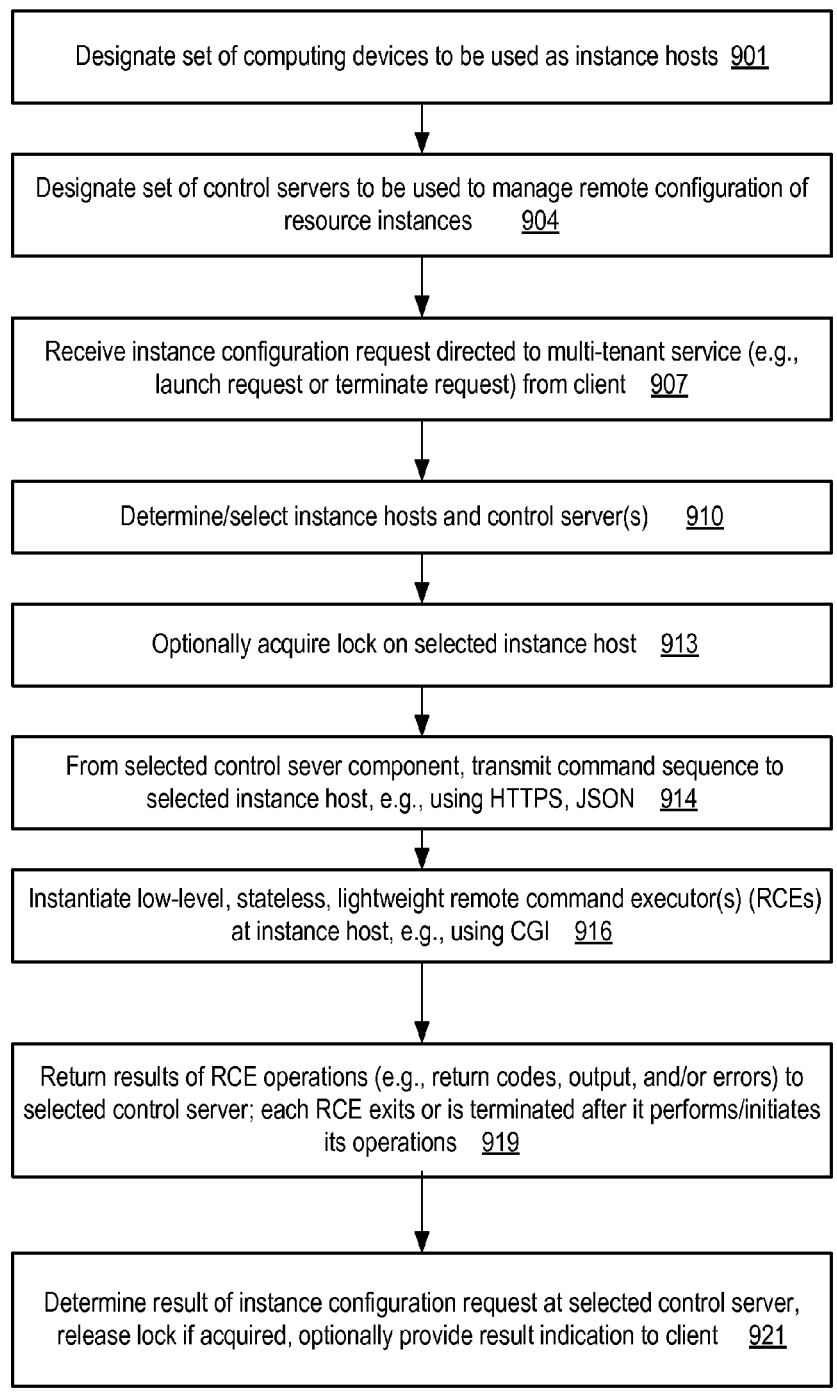
FIG. 9 is a flow diagram illustrating aspects of the operations of control servers operable to perform remote configuration of instance hosts, according to at least some embodiments.

FIG. 9 is a flow diagram illustrating aspects of the operations of control servers operable to perform remote configuration of instance hosts, according to at least some embodiments. As shown in elements 901 and 902, a set of computing devices may be designated to serve as instance hosts of a provider network, and a set of control servers may be designated to manage remote configuration of the instance hosts. Various types of multi-tenant, network accessible services may be provided using resource instances implemented on the instance hosts (and configured with the help of the control servers) in different embodiments, including infrastructure-related services such as virtualized compute services, storage services, or networking-related services, as well as higher-level multi-tenant applications such as relational or non-relational databases, content management services and the like.

An instance configuration request directed to one or more of the multi-tenant services, such as a request to launch a new virtualized compute server, or to terminate an existing virtualized server, may be received in the depicted embodiment (element 907), e.g., at a front-end load balancer or at a front-end control server component such as a client interaction manager 235. Depending on the nature of the configuration request and the implementation of the control server components (e.g., whether components of the control server functionality are distributed across multiple control servers, are implemented as multi-node clusters, or are all incorporated within a single monolithic control server), choices may have to be made as to which specific control servers are to be involved in responding to the client's request, and as to which specific instance host(s) are to be involved. If a client wishes to activate or launch a new compute instance in the depicted embodiment, for example, a particular instance host may be selected (element 910) based on such factors as the utilization level of various instance hosts at a data center or availability container near the source from which the client's request was received, the pricing model the client has signed up for, locality of an available instance host relative to other instance hosts being used for the client, or based on explicit location preferences indicated by the client. Similarly, control server(s) may be selected (element 910) for the client's request based on various factors in different embodiment such as utilization levels of various control servers of the set determined in element 902 or locality (e.g., either proximity to the client or to the chosen instance host).

A number of different control server components, such as an instance state manager 210, a workflow manager 225, a configuration definer 220, and a command communicator 240, may cooperate to response to the client's request in the depicted embodiment. In some embodiments, e.g., in order to prevent conflicting mutations of the selected instance host's configuration state or metadata, a lock may optionally be acquired on the selected instance host (element 913) by one of the control server components, or some other concurrency control mechanism may be used. Different locking granularities may be employed in different embodiments and for different types of configuration changes—e.g., only a subset of the metadata associated with a given instance host may be locked in some embodiments, while in other embodiments metadata for a group of instance hosts may be locked as a unit. A command sequence derived from the configuration request may eventually be transmitted to a selected instance host from a selected control server component (element 914). In some embodiments, standard protocols or formats such as HTTPS and JSON or XML may be used for the command sequence.

At the selected instance host, one or more low-level, stateless, lightweight remote command executors (RCEs) may be instantiated, e.g., in the form of CGI processes or threads, to implement the operations indicated in the command sequence in the depicted embodiment (element 916). Depending on the implementation, either separate RCE threads/processes may be implemented for each command in a sequence, or a single RCE may be responsible for implementing several commands. The RCEs may exit or terminate after issuing or initiating the operations in at least some embodiments. Results of the RCE operations (e.g., return values or exit codes of operating-system or hypervisor-level commands, standard output and/or standard error) may be provided back to the control server components that issued to command requests (element 919) in the depicted embodiment. In some implementations, the RCEs may exit on their own accord, while in other implementations the RCEs may be explicitly terminated (e.g., by sending "kill" signals) after their results have been received. In at least some embodiments, based on the collected RCE results, a higher-level result (e.g., a success result or a failure result) of the client's configuration request may be determined (element 921). If a lock had been acquired to prevent conflicting configuration changes in operations corresponding to element 913, it may be released. In some embodiments, an indication or notification of the result may be provided to the requesting client.

Figure 10:
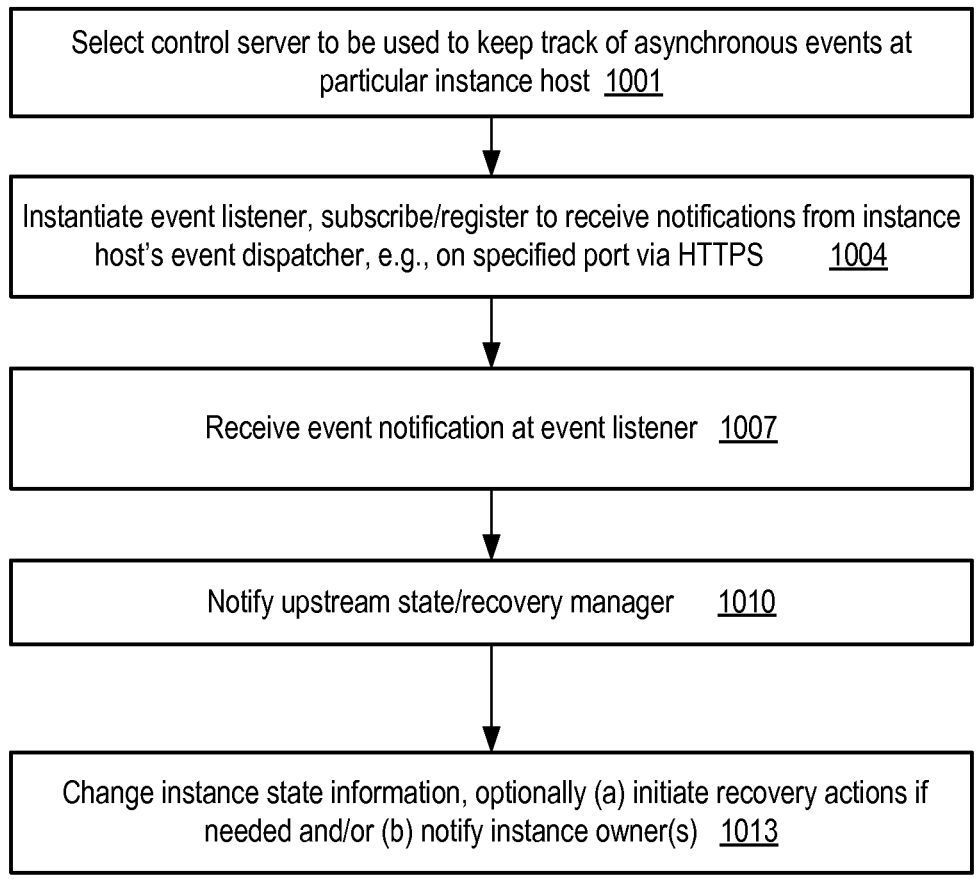
FIG. 10 is a flow diagram illustrating aspects of operations related to remote event notification at a control server, according to at least some embodiments.

As noted earlier, in some embodiments, a control server component may be configured to receive notifications from instance hosts when certain types of events (e.g., events that occur asynchronously with respect to control server commands, such as unexpected process or component failures/shutdowns) occur at the instance hosts. FIG. 10 is a flow diagram illustrating aspects of operations related to remote event notification at a control server, according to at least some embodiments. As shown in element 1001, a particular control server or servers may be selected to keep track of various asynchronous events at a given instance host. In some embodiments, the same control server that is responsible for submitting command sequences to the given instance host may be used, while in other embodiments a different control server may be selected for event notification. An event listener 245 may be instantiated on the selected control server (element 1004). The event listener 245 may subscribe to, or register with, an event dispatcher 310 at the given instance host, to receive event notifications from the instance host. In some embodiments, the event dispatcher may be configured to obtain indications when events of interest occur at the instance host, e.g., from a virtualization software layer event monitor (or an operating system layer event monitor) that is installed on the instance host. The notifications to the event listener at the control server may be provided using a secure networking protocol such as HTTPS in some embodiments, and a specific port designated for event notifications may be selected in such embodiments.

When an event such as an unexpected shutdown or failure occurs, the event dispatcher 310 may transmit a notification using the appropriate format and protocol to the event listener 245 in the depicted embodiment. After the event listener receives the notification (element 1007), depending for example on the nature of the event, one or more other control server components, such as an instance state manager 210 or a recovery manager, may be notified (element 1010). State information about the resource instance(s) affected by the event may be modified, e.g., within the state metadata maintained on the affected instances by the state manager 210 (element 1013). The event listener 245 itself may be unaware of instance state, and may simply be responsible for receiving event notifications from one or more instance host(s) and passing the event notifications on to the appropriate higher-level control server components in the depicted embodiment. Thus, the modular mature of the control server design may isolate event notification reception (the responsibility of the event listener) from higher-level state management decisions in the embodiment shown in FIG. 10. In at least some embodiments, recovery operations on the affected instance host may be initiated by the instance state manager 210 or a separate recovery manager component of the control server for certain types of events. In one embodiment, clients that own resource instances on the affected instance hosts where the events occurred may be notified.

Figure 11:
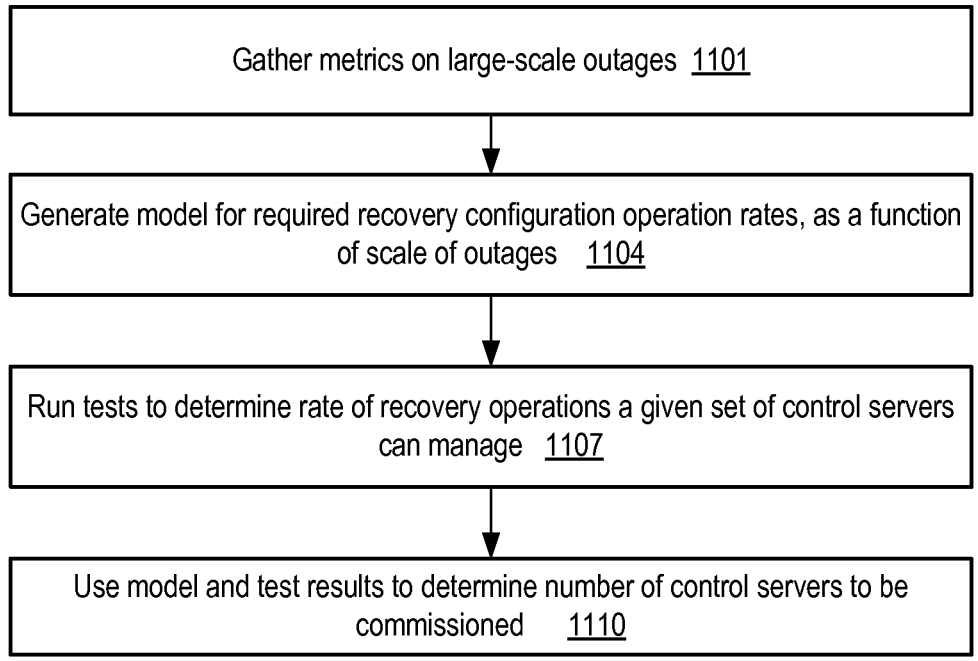
FIG. 11 is a flow diagram illustrating aspects of operations related to determining control server pool size, according to at least some embodiments.

In some embodiments, one or more pools 120 of control servers and/or other resources dedicated to remote management of resource instances (including recovery operations that may be required to restore instance state after failure events) at instance hosts may be set up. The number of control servers included in such pools may vary in different implementations, e.g., based on current operating conditions, and may be determined based on a number of factors. FIG. 11 is a flow diagram illustrating aspects of operations related to determining control server pool size, according to at least some embodiments. Control server pool size may be determined based at least in part on recovery requirements associated with large-scale failure events (such as power failures at the data center level, or availability container level, which affect large numbers of resource instances) in the embodiment depicted in FIG. 11. As shown in element 1101, metrics may be gathered on large-scale outages, such as the frequency of the outages, the range of the number of running resource instances affected, how long various recovery operations take, customer feedback as a function of recovery time, and so on. Based on such metrics, certain target goals for the scale of outage events that should be planned for, and the target recovery times for the instances, may be developed.

As indicated in element 1104, a model (such as a simulation model or an analytical model based on equations) may be generated to determine the rates of various types of recovery operations that may be needed in the event of an occurrence of a large-scale outage of the targeted size. Such recovery operations may for example include checking and rebuilding file systems, copying virtual machine images or instance snapshots from a repository to an instance host, and similar operations at various levels of the control software stack. In one implementation, for example, the model may indicate that in order to complete instance recovery for a failure of 100,000 virtual compute instances within X minutes, the required rate of recovery operations of type R1 is 50,000 per minutes, and the required rate of recovery operations of type R2 is 10,000 per minute. In some embodiments, tests may be run to determine a rate at which various types of recovery operations can be completed by various sizes of control servers (element 1107). Having thus estimated the required rates of various types of recovery operations and the capacity of different types of control servers to perform such operations using the model and the test results, the number of control servers of one or more capacity levels to be commissioned for the control server pool(s) may be determined (element 1111). In some embodiments the model may be used for more detailed recommendations, such as the placement of control servers at various data centers or within different availability containers to optimize recovery operation times. Similar models may also be used in some embodiments to determine the number of control servers that may be needed for standard operating conditions (e.g., in the absence of outages). In such an embodiment, if the number of required control servers of a particular capacity level under normal operating conditions is estimated to be N1, and the number of required control servers of that capacity level under large-scale failures of a targeted size is estimated to be N2, the operator of the provider network may choose a pool size set to the larger of N1 and N2, so that both types of operational conditions can be managed successfully.

Third Party Resource Instances

Figure 12:
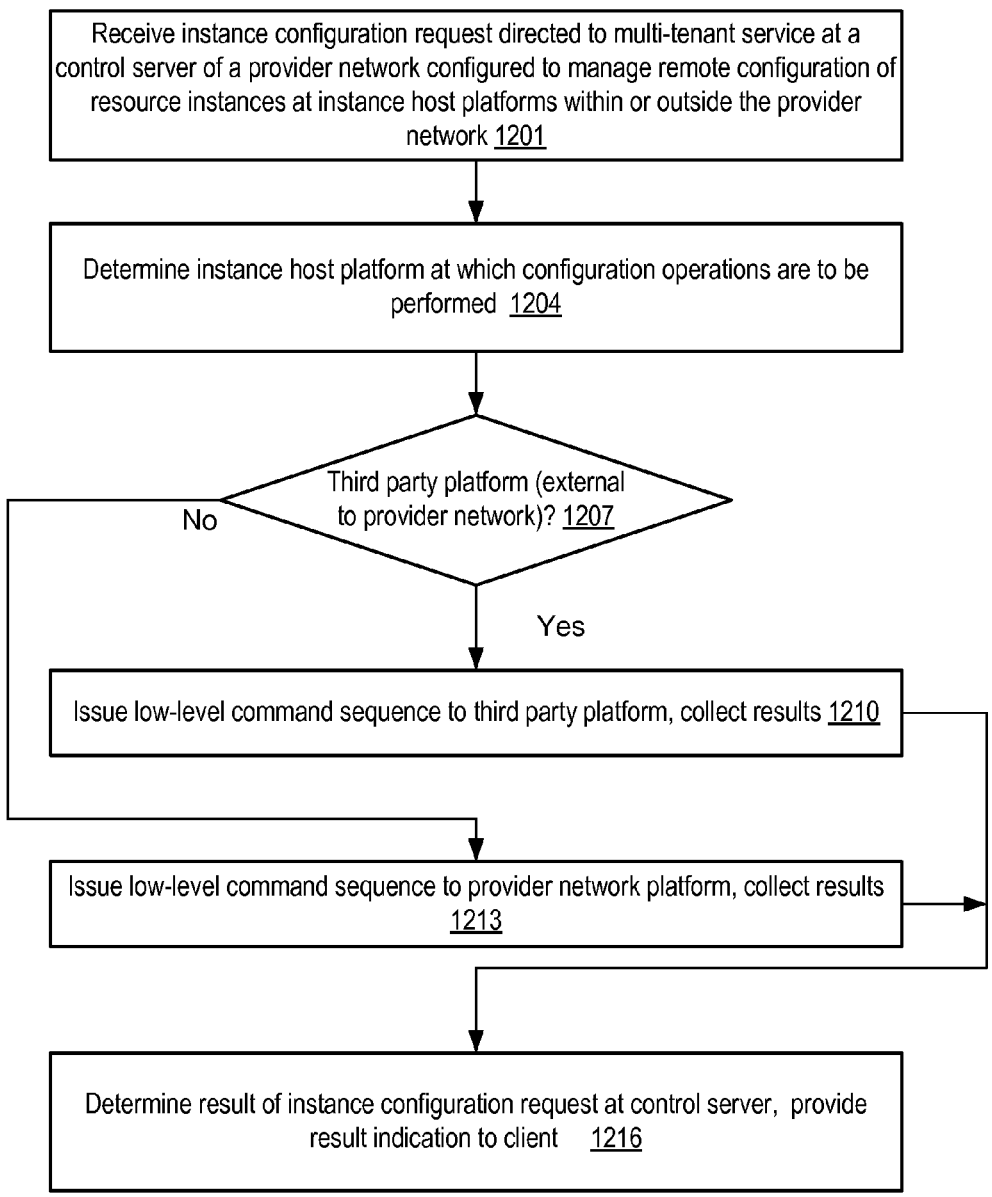
FIG. 12 is a flow diagram illustrating aspects of the operation of a control server configured to manage remote configuration of third party platforms, according to at least some embodiments.

At least in some embodiments, a control server of a provider network (or a distributed collection of control servers collectively) may be capable of managing remote configuration of third party platforms external to the provider network, as illustrated in FIG. 1 for some embodiments. FIG. 12 is a flow diagram illustrating aspects of the operation of such a control server, according to some embodiments. As shown in element 1201 of FIG. 12, an instance configuration request directed to a multi-tenant network-accessible service may be received at a control server capable of managing both third party instance host platforms, as well as instance hosts internal to the provider network. Depending on the nature of the request, the control server may determine a specific instance host platform at which configuration operations corresponding to the request should be performed (element 1204). If the selected platform is a third party platform (as detected in element 1207), a control server component may issue a low-level command sequence to the third party platform (element 1210) and collect the results, e.g., using techniques similar to those described earlier regarding the functionality of the workflow manager and the command communicator. If the selected platform is a provider network platform (as also detected in element 1207), low-level commands may be issued to the provider network platform (element 1213) and the results may be collected. In either case, one or more control server component(s) may analyze the collected results of the low-level command sequence to determine a higher-level result of the instance configuration request, and at least in some embodiments and for certain types of requests, a response may be provided to the client that submitted the request (element 1216). As noted earlier, the types of functionality illustrated with respect to third-party platforms in FIG. 12 may also or instead be supported with respect to platforms at point-of-presence locations and similar remote platforms in at least some embodiments.

Figure 13:
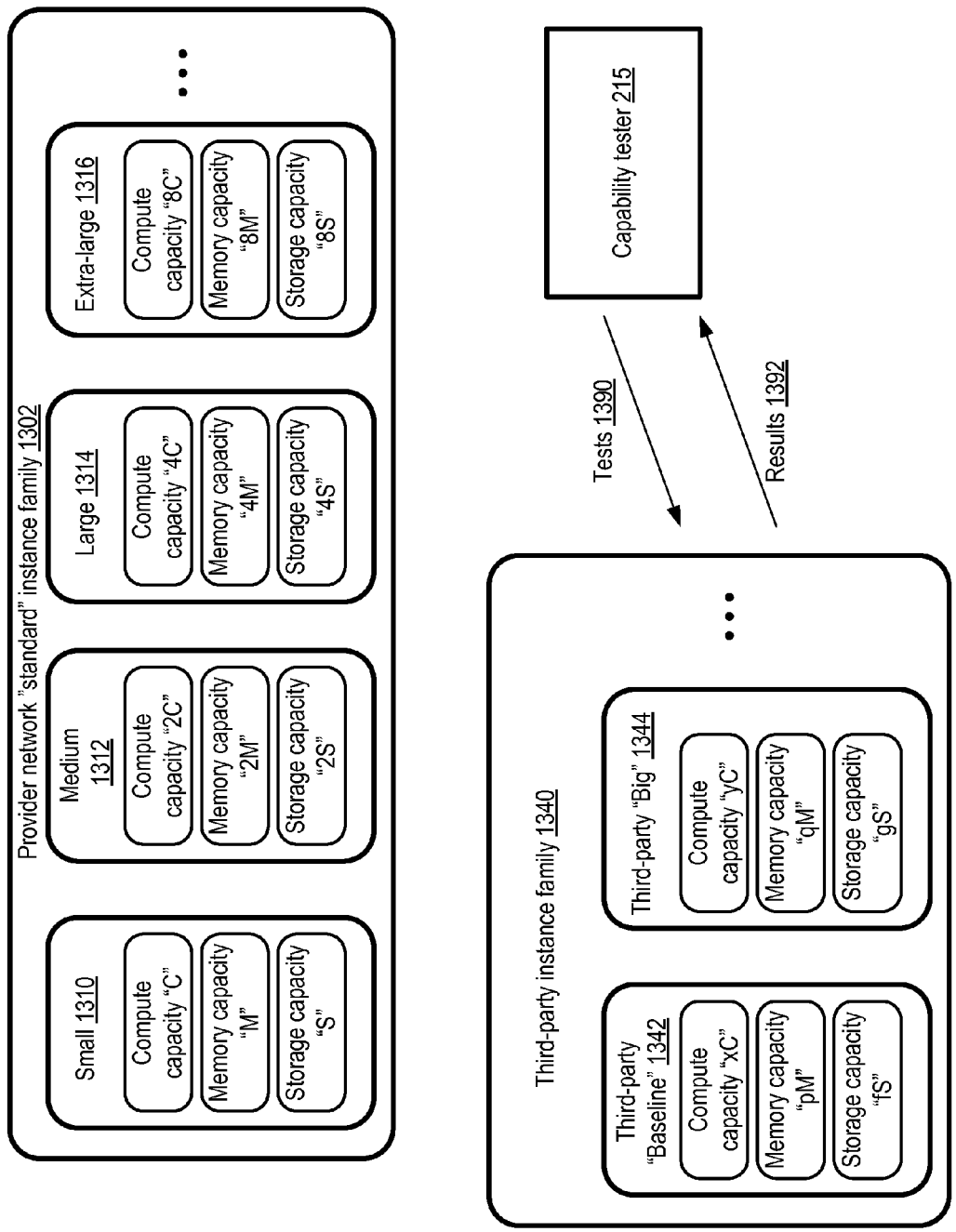
FIG. 13 illustrates examples of compute resource instance definitions supported by a provider network and by a third party, according to at least some embodiments.

In some embodiments, a provider network 102 may support one or more default "instance families" representing groups of resource capacity units. Some instance families may be intended for general use, i.e., for clients that run commonly-used applications; other instance families may be supported for specialized use, such as for high-memory applications, high-CPU applications, clustered applications, parallel applications or the like. In some embodiments where third parties (e.g., entities other than the provider network operator) are allowed to register their instance hosts for remote instance configuration from control servers of the provider network, at least some of the third parties may define their own default instance families. In at least one embodiment, clients may specify variations from the default instance types defined by the provider network and/or the third parties, as described below in further detail. FIG. 13 illustrates examples of respective compute resource instance definitions that may be supported by a provider network and by a third party, according to at least some embodiments. One example of a "standard" instance family 1302 that may be supported using instance hosts belonging to a provider network 102 is shown, together with another example instance family 1340 defined by a third party for the third party's instance hosts. Compute resource instance types may differ from one another in various characteristics, such as compute capacity, memory capacity, storage capacity, networking capacity, operating system version or address sizes (e.g., 32-bit vs. 64-bit addresses), and the like. In FIG. 13, instance types are shown as having differing compute capacity (expressed in units called "C"), memory capacity (expressed in units called "M"), and storage capacity (expressed in units called "S"); other differences between instance types are not shown for clarity. More than one instance family may be defined in some embodiments, either within the provider network, or within a given third party network—for example, a special "high-memory" instance family may be supported for memory intensive applications. In one embodiment, a given provider network or a given third party may define or support only one kind of instance.

In some embodiments, the different instance types of a given instance family may be implemented using a small set of different hardware server types (e.g., even a single server type may suffice for all the instance types of a given family in some cases). For example, in the illustrated embodiment, the various instance types (small, medium, large and extra large) of the standard instance family 1302 may be implementable within the provider network 102 using a single server type "S1" with 32 processing cores, 64 gigabytes of available main memory and 1600 gigabytes of available disk storage. The relative compute capacities of the four instance types of standard instance family 1302 are in the ratio 1:2:4:8. If an extra large instance 1316 is allowed to use all 32 cores of an S1 server, a large instance 1314 may be allowed to use up to 16 cores, a medium instance 1312 may use up to 8 cores, and a small instance 1210 may use up to 4 cores. Similarly, if an extra-large instance 1316 is allowed to use all 64 gigabytes of main memory, the maximum memory usable by instance types large, medium and small may be set to 32 gigabytes, 16 gigabytes, and 8 gigabytes respectively. Storage capacity limits for the different instance types may be set in the same ratio: all 1600 gigabytes for extra large instances, 800 gigabytes for large instances, 400 gigabytes for medium instances and 200 gigabytes for small instances.

The limitations on processor core usage, memory usage, storage usage, as well a other limitations such as networking limits and the like may be controlled using settings or parameters of hypervisors or other low-level software used to implement the different instance types in some embodiments. Thus, by changing virtualization settings on a given S1 server with the help of the control server components described earlier, it may be possible to set up eight small instances, four medium instances, two large instances, one extra-large instance, or various combinations of small, medium and large instances (e.g., one large instance, one medium instance and two small instances) in at least some embodiments. The fact that the capacity of each larger instance type in the standard family can potentially be divided up to form integral numbers of smaller instances may be helpful in flexible configuration of instance hosts from control server components. Although a single server type S1 is mentioned above, in some embodiments the various capacity levels of a given instance family may be implemented using several different server types, and there is no requirement that the number of cores or other resources used for the different capacity levels of an instance family be integral multiples of each other.

In some embodiments, a third party that wishes to utilize the control server functionality of a provider network for the remote configuration of third party platforms may be required to use the same hardware platforms or vendors for their instance host platforms that are use for the provider network's instance hosts. At least some third party operators may, however, use different types of hardware for their candidate instance host platforms in at least some embodiments, and as a result, their instance types may differ in various types of capacity (e.g., compute, memory, or storage capacity) in such embodiments from the instance types native to the provider network. In the example of FIG. 13, the third-party instance family 1340 includes a "baseline" instance type and a "big" instance type. The capacity ratios for the different types of instances defined by a given third party may be provided to the provider network operator in at least some embodiments, e.g., as part of a business agreement between the provider network operator and the third party. For example, in FIG. 13 the ratio between the compute capacities of the "baseline" and "big" third party instance types is shown as x:y, the ratio between the memory capacities of the third party instance types is shown as p:q, and the ratio between the storage capacities is shown as f:g.

In embodiments where the provider network implements client-facing interfaces supporting the third party instance family 1340, e.g., by providing a shared instance reservation interface and/or shared configuration APIs, clients may need to be informed regarding the relative capacities of the third party instances and the instances of the provider network itself. In the depicted embodiment, for example, a capability tester component 215 of the provider network's control servers may be responsible for determining the capacity of various third party instance types relative to the instance types of "standard" instance family 1302. The capability tester may, for example, transmit a set of tests 1390 to specific third party instance host platforms on which "baseline" or "big" instances have been launched, and use the results 1392 of the tests to determine the ratio of the capacity of the third party instance types to the provider network's standard instance types, as well as to verify that the ratios (e.g., x:y, p:q, f:g) of the capacities of the third party instance types are correct. In addition, the capability tester 215 may also be responsible in some embodiments for validating new instance host candidate platforms that the third party wishes to add to its fleet of instance hosts to be controlled remotely from control server components of the provider network. In addition to performance and capacity testing, other types of tests may also be conducted by the capability tester on the third party platforms in some embodiments, including for example tests to ensure that desired software has been installed, that RCEs of the appropriate kind can be successfully invoked by the control servers as needed to implement configuration operations, and so on.

In at least some embodiments in which the provider network and/or the third party network defines a set of default supported instance types, further flexibility regarding the properties of the resource instances that can be obtained by clients may be supported by allowing clients to indicate variations from the supported instance types' properties. For example, a set of default virtualized instance types may be supported in one embodiment, where each instance type has an associated set of properties or capabilities. One particular default instance type DIT1 may be characterized by a CPU performance property CP, a disk storage property DP, a network throughput property NP, a network latency property NLP, and an installed software property SP. A client may indicate, e.g., in an instance configuration request, that they wish to launch a resource instance whose properties are generally similar to the properties defined for DIT1, but with a different network latency property NLP2, or a different set of installed software SP2, or with some other property variation. If the control server components determine that the requested property variation can be supported, a set of commands to configure a resource instance in accordance with the client's request (e.g., including commands to implement the property variation) may be issued using the kinds of techniques described above. The decoupling of the control server components described herein may allow such variations to be handled much more easily than in environments where more hard-wired approaches to instance configuration are used.

In some embodiments, the flexibility allowed by the kinds of control server architecture shown in FIG. 4 may allow clients to define their own instance types, whose properties may differ substantially from the default instance types supported by the provider network and/or by third party providers. In such embodiments, a client C1 may submit, e.g., via a programmatic interface and/or using an instance definition language or protocol defined by the provider network, a definition of their preferred instance type that details various performance and other capabilities. Various control server components (such as capability tester 215) may determine which, if any, of the instance host platforms (either platforms internal to the provider network, third party platforms, or both) are capable of supporting the client-defined instance types, and those instance host platforms may be used for that client's instance configuration requests. In some embodiments, fully dynamic instance definition may be supported, in which a client may define customized properties or characteristics for any of their instances as desired.

Figure 14:
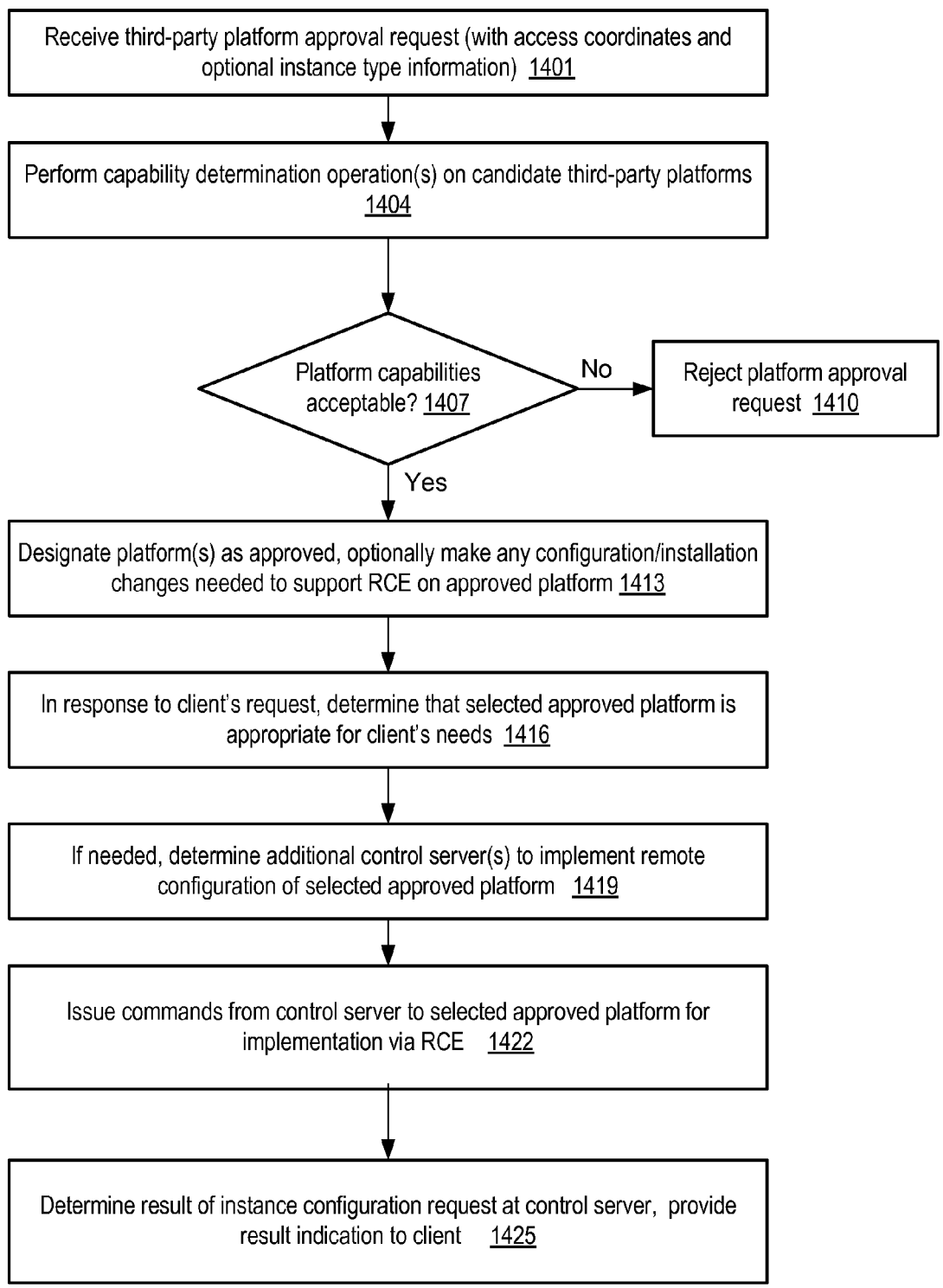
FIG. 14 is a flow diagram illustrating aspects of operations performed by control servers of a provider network in response to platform approval requests for third party platforms, according to at least some embodiments.

FIG. 14 is a flow diagram illustrating aspects of operations performed by control servers of a provider network to configure resource instances of a third party network to provide network-accessible services, according to at least some embodiments. As shown in element 1401 of FIG. 14, a third party platform approval request may be received via a programmatic interface (such as an API or a web page) by a control server front-end component, such as an interaction manager 235. The approval request may include various types of information about the candidate platform for which approval is desired, such as the network address or coordinates of the platform, credentials usable to log in to the platform as an administrator using the network address, instance type information about the kinds of instances to be supported on the platform to provide one or more multi-tenant services, and/or test information indicating types of tests that may be run to validate that the platform is capable of supporting resource instances it claims to support. (It is noted that at least in some embodiments, a single approval request may indicate multiple candidate platforms, in which case the types of testing and other operations described herein for a single platform may be repeated for each of the candidate platforms indicated.) In response to the approval request, a control server component such as capability tester 215 may initiate one or more capability determination operations on the candidate platform (element 1404), such as installed software stack verification, performance tests, reliability tests, checks to verify that RCEs can be launched via remote commands (including, for example, whether a web server or other command receiver on the candidate platform can be configured to launch CGI-based processes or threads), and the like. In embodiments where an instance type to be supported on the candidate platform is indicated, the capability tester 215 may verify whether the indicated instance types, or the indicated number of instances of the instance types, can be instantiated on the candidate platform. Test definitions for instance types to be supported, or pointers to such test definitions may be included in the approval requests in some embodiments. The types of instances to be supported may include instance types or families defined by the provider network, defined by the third party, or defined by both the third party and the provider network in various embodiments.

If the results indicate that the candidate platform capabilities are acceptable (as determined in element 1407), the platform may be designated as approved (element 1413), e.g., for inclusion in a pool of platforms on which resource instance configuration is to be performed remotely using control servers of the provider network. If any additional configuration changes on the platform are required to support remote commands (such as web server configuration changes need to launch CGI processes using the appropriate binaries or libraries), such changes may be made in the depicted embodiment, for example using the administrator credentials provided in the approval request. If the candidate platform's capabilities are found unacceptable, the approval request may be rejected (element 1410).

When a client's instance configuration request is subsequently received at a control server (e.g., via the interaction manager 235), a control server component (e.g., the instance state manager 210) may make a determination as to whether an instance host of the provider network is to be used to respond to the request, or whether an approved third party platform is to be used, as also described above with respect to FIG. 12. In at least some embodiments, clients may be enabled to indicate their preferences as to the source (e.g., the provider network, or a particular third party network) on whose platforms their instances are to be launched, as described below with reference to FIG. 15. In other embodiments, the instance state manager may determine to choose an approved third party instance host even if the client does not explicitly indicate a preference for a third party provider, based on any of various factors such as the proximity of the third party platform to the client's network, or the current or anticipated utilization level of the third party platform relative to that of other instance hosts. A determination may accordingly be made to use a particular approved third party platform (element 1416) to perform the configuration requested by the client.

In at least some embodiments in which control server components are distributed across multiple servers, the specific control servers at which the lower-level control server components (e.g., the workflow manager, the command communicator, and the event listener) to be used for remote configuration of the selected third party instance host platform may be selected (element 1419). A command sequence may be sent from the appropriate control server to the selected approved third party instance host for implementation via one or more RCEs (element 1422), in a manner analogous to the way command sequences are sent to instance hosts of the provider network itself, as described previously in the context of FIGS. 4, 5, 7, 8 and 9. For example, the HTTPS protocol may be used for the command sequence, and the commands themselves may be formatted in accordance with JSON, XML, or a variant of JSON or XML in different embodiments. In one embodiment, concurrency control for configuration changes on third party instance host platforms may be implemented, e.g., using a lock manager of the provider network a lock manager implemented by the third party operator, or a combination of lock managers of the provider network and the third party. In such an embodiment, prior to issuing the command sequence to the third party platform, one or more locks may be obtained from the appropriate lock manager(s), in a manner similar to that described above for locking instance hosts of the provider network, and the lock(s) may be released after the operations are initiated or completed. At the third party platform, a command receiver such as a web server may instantiate RCEs (e.g., using CGI) as needed to perform the requested operation or operations in some embodiments, and the RCEs may terminate or exit after the operations are initiated. The results of the RCE operations, such as exit codes or return codes, standard output and/or standard error, may be provided back to the control server, and a response to the client's request may be provided based on the collected RCE results (element 1425). Thus, third party providers may be able to take advantage of the existing instance configuration control infrastructure built by the provider network operator, while continuing to own and manage the infrastructure of their third party data centers. In many cases, it may become possible for third parties to dramatically increase the utilization of, and monetize, their excess or underused hardware platforms. As noted previously, a client network may also comprise underutilized hardware platforms, and clients of the provider network may also be enabled to use the provider network's control servers to better utilize such platforms in some embodiments. For example, a client may be able to launch resource instances on the client's own hardware platforms with the help of the control server components of FIG. 2 running on provider network equipment in such an embodiment. Similarly, in at least one embodiment, an entity operating or managing a point-of-presence (POP) location may use the provider network's control servers to configure hosts for resource instance hosting.

In at least one embodiment, capability tests of the kind described above may be repeated for third party platforms over time, for example to periodically extend the approval of such platforms. In one such embodiment, a schedule of capability test iterations to be re-executed on one or more third party platforms to renew approval may be determined. Iterations of the capability tests may then be initiated in accordance with the schedule, and a determination as to whether the approval is to be renewed may be based at least in part on the results of the iterations.

As mentioned earlier, in some embodiments clients may be provided the opportunity to programmatically indicate their preferences for the providers whose instance hosts are to be used for the client's resource instances. FIG. 15 illustrates an example of a programmatic user interface that may be implemented to enable clients to select resource instances from a plurality of providers, including instances instantiated on third party platforms that are controlled by control server components of a provider network. The illustrated user interface comprises a web page 1500 with a message area 1503 and several form fields in the depicted embodiment. As indicated in the message area 1503, clients are requested to provide some preliminary preferences regarding their instance needs using web page 1500, and a submission of the form fields would result in a list of specific instance host options form which the client may select one or more for the desired instances.

Using field 1507, clients may indicate the type of resource(s) (e.g., compute versus storage versus network) they wish to acquire, e.g., via drop-down list of choices with compute resources being the default resource type. Field 1509 may be used to specify a preferred resource vendor; if the client wishes not to specify a particular vendor, the default choice of "cheapest available" vendor may be used. Using field 1511, the client may indicate a preferred availability container, or leave the default option of the geographically nearest availability container set. Field 1512 enables the client to choose from among various instance types that are available, some of which may be implemented by the provider network using its own instance hosts, while others may be implemented using instance hosts owned by third parties. The client may click on various links included within element 1512 to find out more details about the instance types of each family, the available pricing policies, and/or additional information. The client may specify the number of resource instances needed using form field 1513, and the duration for which the instances are needed using element 1515 in the depicted embodiment. The client's preferences may be submitted using the "Submit!" button 1519.

It is noted that different preference information may be solicited from the client in other embodiments than is shown in FIG. 15, and that programmatic interfaces other than web pages (e.g., APIs, command-line tools, or graphical user interfaces) may be used to obtain the client's preferences in some embodiments. It is also noted that in some embodiments, some of the operations illustrated in the flow diagrams described above, such as those of FIGS. 9, 10, 11, 12 and 14, may be performed in a different order than shown in the figures, and that in other embodiments, some of the operations may be performed in parallel instead of sequentially. In various embodiments, some of the operations shown in the flow diagrams may be omitted.

Use Cases

The techniques described above, of efficient, modular resource instance remote configuration control, may be beneficial in various types of environment in which large numbers of platforms are to be used for hosting virtualized resources. They may be particularly useful in environments where the alternative approach of using on-platform configuration software required to support the various multi-tenant services on offer to clients may impose a substantial overhead. Such on-platform configuration software may reduce the proportion of compute cycles, memory and/or storage that should ideally be dedicated to customer-requested, revenue-generating resource instances instead.

Illustrative Computer System

Figure 16:
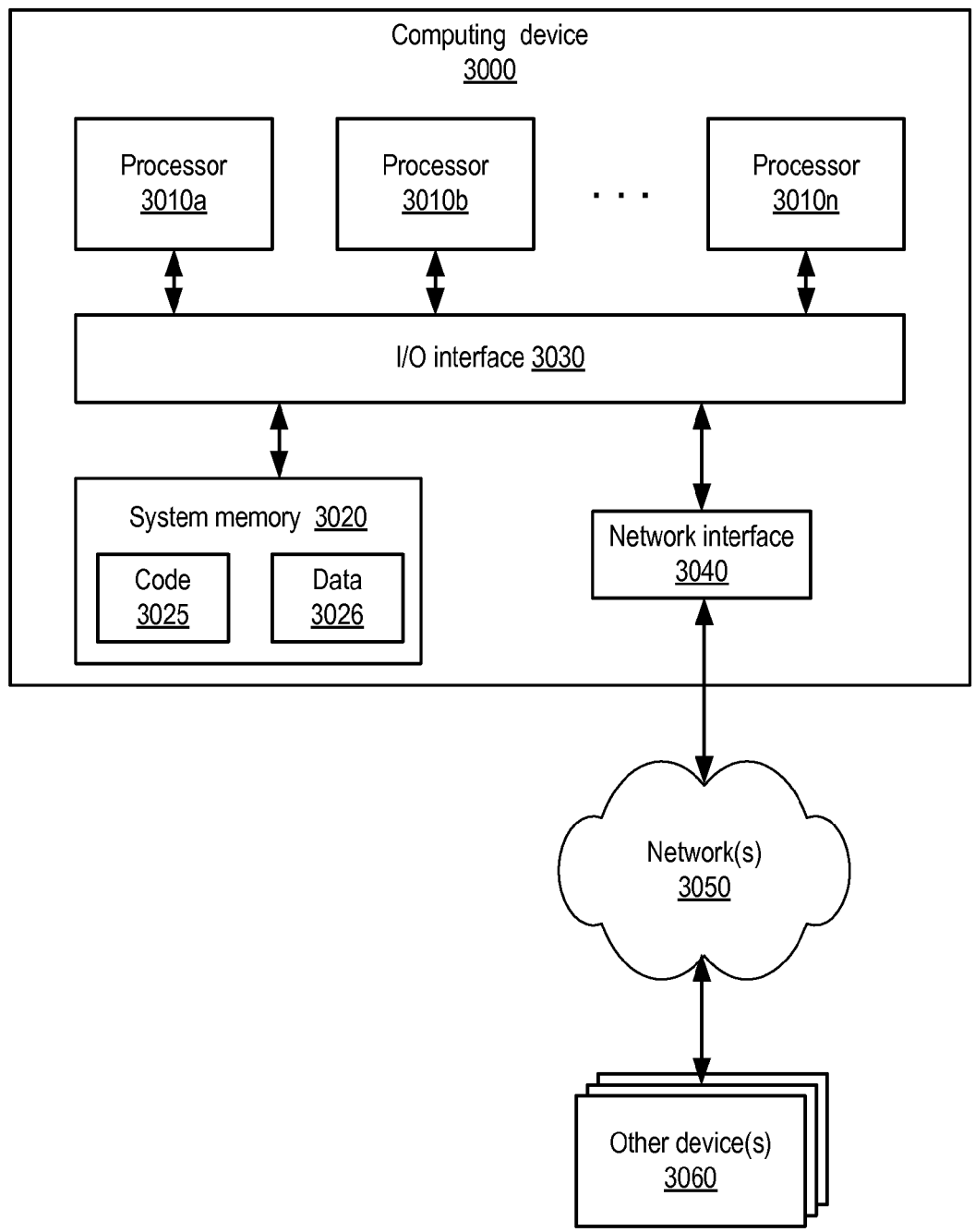
FIG. 16 is a block diagram illustrating an example computing device that may be used in at least some embodiments.

In at least some embodiments, a server that implements a portion or all of one or more of the technologies described herein, including the techniques to implement the functionality of the various control server components and/or the instance hosts, may include a general-purpose computer system that includes or is configured to access one or more computer-accessible media. FIG. 16 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 15, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 15 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
receiving, at a provider network supporting remote configuration of resources of a network-accessible service, a platform approval request comprising an indication of one or more candidate platforms for hosting virtualized resources;
performing, in response to the platform approval request, a capability determination operation on a particular candidate platform of the one or more candidate platforms;
designating, based at least in part on a result of the capability determination operation, the candidate platform as an approved platform to be used for hosting virtualized resources that are to be configured at least in part via one or more control servers of the provider network;
issuing, from a particular control server of the one or more control servers, in response to a resource request from a client, one or more configuration commands to instantiate a particular virtualized resource at the approved platform; and
providing, to the client, a reply to the resource request based at least in part on a result of an operation initiated by a remote command executor instantiated at the approved platform in response to the one or more configuration commands, wherein the remote command executor terminates after initiating the operation.

2. The method as recited in claim 1, wherein the capability determination operation comprises checking whether the candidate platform is configurable to instantiate the remote command executor.

3. The method as recited in claim 1, wherein the capability determination operation comprises checking whether the candidate platform comprises a web server configurable to instantiate the remote command executor in accordance with the Common Gateway Interface (CGI).

4. The method as recited in claim 1, wherein the network-accessible service implemented by the provider network defines a set of supported virtualized resource instance types, further comprising:
receiving an indication, in the platform approval request, of a particular virtualized resource instance type of the set of supported virtualized resource instance types, wherein the particular candidate platform is targeted to support the particular virtualized resource instance type, wherein the capability determination operation comprises a test to check whether the particular virtualized resource instance type can be implemented on the particular candidate platform.

5. The method as recited in claim 1, wherein the network-accessible service implemented by the provider network defines a set of supported virtualized resource instance types, further comprising:
receiving an indication, in the platform approval request, of a different virtualized resource instance type that is not a member of the set of supported virtualized resource instance types, wherein the particular candidate platform is targeted to support the different virtualized resource instance type.

6. The method as recited in claim 1, wherein the platform approval request is received via a programmatic interface implemented at least in part for third-party interactions, and wherein the one or more candidate platforms are resident at a facility external to the provider network.

7. The method as recited in claim 1, wherein the one or more candidate platforms are resident at a point-of-presence (POP) facility.

8. A system, comprising one or more computing devices configured to:
   receive, at a provider network implementing a plurality of network-accessible services, a platform approval request comprising an indication of one or more candidate platforms for hosting virtualized resources;
   initiate, in response to the platform approval request, a capability determination operation on a particular candidate platform of the one or more candidate platforms;
   designate, based at least in part on a result of the capability determination operation, the particular candidate platform as an approved platform to be used for hosting virtualized resources that are to be configured at least in part via one or more control servers of the provider network; and
   issue, from a particular control server of the one or more control servers, in response to a resource request from a client, one or more configuration commands to configure a particular virtualized resource at the approved platform using a remote command executor instantiated at the approved platform.

9. The system as recited in claim 8, wherein the particular control server is further operable to:
   provide, to the client, a reply to the resource request based at least in part on a result of an operation initiated by the remote command executor, wherein the remote command executor is configured to terminate after initiating the operation.

10. The system as recited in claim 8, wherein the capability determination operation comprises checking whether the candidate platform is configurable to instantiate the remote command executor.

11. The system as recited in claim 8, wherein the capability determination operation comprises checking whether the candidate platform comprises a web server configurable to instantiate the remote command executor in accordance with the Common Gateway Interface (CGI).

12. The system as recited in claim 8, wherein the platform approval request includes an indication of a particular virtualized resource instance type, wherein the particular candidate platform is targeted to support the particular virtualized resource instance type.

13. The system as recited in claim 12, wherein the capability determination operation comprises a test to check whether the particular virtualized resource instance type can be implemented on the particular candidate platform.

14. The system as recited in claim 8, wherein the provider network defines a set of supported virtualized resource instance types, wherein the particular virtualized resource instance type belongs to the set of supported virtualized resource instance types.

15. The system as recited in claim 8, wherein the provider network defines a set of supported virtualized resource instance types, wherein the particular virtualized resource instance type does not belong to the set of supported virtualized resource instance types, wherein the platform approval request comprises an indication of one or more tests to be used to verify that the particular candidate platform is capable of implementing the particular virtualized resource instance type.

16. The system as recited in claim 8, wherein the one or more control servers are configured to designate the particular candidate platform as an approved platform for at least a set of default virtualized resource instance types, wherein the resource request from a client comprises an indication of a particular virtualized resource instance of an instance type that is not included in the set, wherein the one or more configuration commands are issued to configure the particular virtualized resource instance.

17. The system as recited in claim 16, wherein a particular property of the particular virtualized resource instance differs from corresponding properties of each of the default virtualized resource instance types, wherein the particular property comprises at least one of (a) a performance property (b) a storage capacity property or (c) a supported software feature property.

18. The system as recited in claim 8, wherein the one or more configuration commands are transmitted via a variant of the HyperText Transfer Protocol.

19. The system as recited in claim 8, wherein the one or more configuration commands are transmitted in accordance with a variant of JavaScript Object Notation (JSON) format.

20. The system as recited in claim 8, wherein the one or more computing devices are further operable to:
   implement a programmatic interface enabling a client to select a platform source for a particular resource, from among a set of available sources that includes (a) the provider network and (b) an owner of the approved platform.

21. The system as recited in claim 8, wherein the platform approval request is received from the client, and wherein the one or more candidate platforms are resident in a client network of the client.

22. A non-transitory computer-accessible storage medium storing program instructions that when executed on one or more processors implement a control server of a provider network, wherein the control server is configured to:
   after receipt of an instance configuration request from a client, directed to a network-accessible service implemented at least in part using resource instances whose configuration is managed from within the provider network,
      determine whether one or more configuration operations corresponding to the instance configuration request are to be performed at a remote platform external to the provider network;
      in response to determining that the one or more configuration operations are to be performed at a remote platform external to the provider network,
         issue one or more commands to a selected remote platform external to the provider network; and
         receive, from the selected remote platform, results of the one or more commands;
      in response to determining that the one or more configuration operations are not to be performed at a remote platform external to the provider network,
         issue one or more commands to a selected instance host within the provider network;
         receive, from the selected instance host, results of the one or more commands; and
      provide a response to the instance configuration request, based at least in part on results of the one or more commands, to the client.

23. The non-transitory computer-accessible storage medium as recited in claim 22, wherein in response to determining that the one or more configuration operations are to be performed at the remote platform external to the provider network, the control server is configured to:

issue the one or more commands to a command receiver at the selected remote platform external to the provider network, wherein the command receiver is configured to instantiate a remote command executor at the selected third party platform in response to a particular command of the one or more commands, wherein the remote command executor is configured to initiate a particular operation corresponding to the particular command, provide a result of the particular operation to the command receiver, and exit.

24. The non-transitory computer-accessible storage medium as recited in claim 22, wherein prior to issuing the one or more commands to the selected remote platform, the control server is configured to obtain a lock on the selected remote platform using a lock manager implemented within the provider network.

25. A non-transitory computer-accessible storage medium storing program instructions that when executed on one or more processors:

receive a platform approval request indicating a third party platform to be considered as a candidate to host one or more virtualized resources;

identify one or more capability tests to be executed on the third party platform, including at least one test to check whether a remote command executor configured to support a particular command protocol can be implemented on the third party platform;

initiate an execution of the one or more capability tests on the third party platform; and determine whether to approve the third party platform based at least in part on results of the one or more capability tests.

26. The non-transitory computer-accessible storage medium as recited in claim 25, wherein the one or more capability tests comprise a particular performance test to check a performance capability of the third party platform in accordance with a performance level defined for a particular instance type supported at a network-accessible service of a provider network.

27. The non-transitory computer-accessible storage medium as recited in claim 25, wherein the one or more capability tests comprise a particular performance test to check a performance capability of the third party platform in accordance with a performance level indicated in the approval request, for a particular instance type defined by an initiator of the approval request.

28. The non-transitory computer-accessible storage medium as recited in claim 25, wherein the instructions when executed on the one or more processors:

determine a schedule of capability test iterations to be re-executed on the third party platform to renew an approval of the third party platform;

initiate an iteration of capability tests in accordance with the schedule; and determine whether the approval is to be renewed based at least in part on a result of the iteration.

* * * * *